United States Patent
Nishida

(10) Patent No.: US 8,300,695 B2
(45) Date of Patent: Oct. 30, 2012

(54) IMAGE ENCODING APPARATUS AND IMAGE ENCODING METHOD

(75) Inventor: Kazuhito Nishida, Nasushiobara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1121 days.

(21) Appl. No.: 12/065,074

(22) PCT Filed: Jan. 17, 2006

(86) PCT No.: PCT/JP2006/300527
§ 371 (c)(1),
(2), (4) Date: Aug. 5, 2008

(87) PCT Pub. No.: WO2007/057985
PCT Pub. Date: May 24, 2007

(65) Prior Publication Data
US 2009/0268820 A1    Oct. 29, 2009

(30) Foreign Application Priority Data
Nov. 21, 2005    (JP) .................................. 2005-335186

(51) Int. Cl.
H04N 7/12    (2006.01)
H04N 11/02   (2006.01)
H04N 11/04   (2006.01)
H04B 14/04   (2006.01)

(52) U.S. Cl. ................................................. 375/240.16

(58) Field of Classification Search .................. None
See application file for complete search history.

(56) References Cited

U.S. PATENT DOCUMENTS

| 6,222,882 B1 * | 4/2001 | Lee et al. ............... 375/240.16 |
| 6,574,370 B1 | 6/2003 | Kazayama et al. |
| 2001/0002922 A1 * | 6/2001 | Hayashi ................. 375/240.16 |
| 2005/0276329 A1 * | 12/2005 | Adiletta et al. .......... 375/240.16 |

FOREIGN PATENT DOCUMENTS

| JP | 8-149481 A | 6/1996 |
| JP | 00/05899 A1 | 2/2000 |
| JP | 2000-278694 A | 6/2000 |
| JP | 2001-169288 A | 6/2001 |
| JP | 2003-319400 A | 11/2003 |
| JP | 2004-229150 A | 8/2004 |
| WO | WO 9921135 A1 * | 4/1999 |

* cited by examiner

*Primary Examiner* — Faruk Hamza
*Assistant Examiner* — Christopher Crutchfield
(74) *Attorney, Agent, or Firm* — Birch, Stewart, Kolasch & Birch, LLP

(57) ABSTRACT

Since a global motion vector detector is disposed on the same chip as, for example, an image converter utilizing spatial correlations, a first problem is that an original frame is not completely reproduced in an image, since the frame to be referred to when detecting the global motion vector is an image obtained by inverse-converting a nonreversibly compression-converted image. A second problem is that, upon high-efficiency image encoding, the detection process of the global motion vector is performed even when it is not necessary to detect the global motion vector. An image encoding apparatus is equipped with a mechanism for detecting a global motion vector. The mechanism is located outside an image converter that utilizes spatial correlations, such as high-frequency component removal by a DCT and round-down by a quantization, and variable encoding.

9 Claims, 17 Drawing Sheets a)

b)

Frame 2

Frame 1 a) 320×240 b) 1920×1080 a)

b)

IMAGE ENCODING APPARATUS AND IMAGE ENCODING METHOD

BACKGROUND OF THE INVENTION

1. Field of the Invention

The present invention relates to an image coding apparatus utilizing global motion vector upon coding of image inputted by means of motion vector.

2. Description of the Related Art

Conventionally, in high-efficiency coding of image, the following three image transformations are mainly used for compressing amounts of moving image information, thereby carrying out coding. Therefore, the three image transformations are the first image transformation by means of correlation of image (spatial correlation), the second image transformation by means of correlation between times (time correlation), and the third image transformation by means of variable length coding. Specifically, in the second coding by means of time correlation, moving direction and moving distance of image between temporally-different frames (inputted images) are detected as 'motion vector' on a macro block basis, and a frame is expressed based on pixel information of the macro block and the motion vector information, thereby reducing the amount of image information.

However, in the detection process of the 'motion vector', when detecting a block in the other frame, a destination (or a source) of the macro block, for example, in the case of moving image including dynamic scenes such as a sports moving image, it is required to set a wide search range, thereby greatly increasing amounts of the calculation. Therefore, in WO00/05899, it is disclosed that the global motion vector of the entire image is detected by means of the reduced image of the current frame, and the search range of destination of the macro block is narrowed by means of the global motion vector, thereby detecting the motion vector.

FIG. 17 is a diagram exemplifying another detection of motion vector of the macro block by means of the above global motion vector. As shown FIG. 17 (a), at the outset, the global motion vector (1701) of the global macro block α' including the macro block α, of which motion vector is to be detected, is detected. Therefore, it is probable that the macro block α moves within a predetermined range including the destination of the global macro block α' indicated by this global motion vector. Therefore, calculation of the range β of FIG. 17 (b) as the search range of the motion vector of the macro block α is carried out, so that it becomes possible to detect the motion vector (1702) of the macro block α without unnecessarily widening search range.

However, in the above detection of the global motion vector used for the second image transformation, the detector for the global motion vector is arranged in the same chip of the image transformer utilizing spatial correlation as the first image transformation technology, resulting in two problems: they are as follows. The first problem is that a frame referenced upon detection of the global motion vector is not perfectly identical to an inputted image. The reason for this is that the referenced frame is reproduced by inverse transformation of data coded by irreversible transformation by means of the spatial correlation, in which high-frequency components acquired by DCT (Discrete Cosine Transform) are removed, and the remainder is cut by quantization, so that the frame is possibly not the same image as the source frame. Therefore, error can be observed in the global motion vector, which is detected by referring to the reference frame, incorrectly reproduced as described above.

In addition, the second problem is that the detection of the global motion vector is carried out upon high-efficiency coding of image even if the detection of the global motion vector is unnecessary. For example, in the case of a moving image configured by high-vision images of 1,920×1,080 pixels, the maximum moving distance on a pixel basis is 1,920 in a horizontal direction, and 1,080 in a vertical direction (therefore, on a ½-pixel basis, the moving distance is double), so that it is required to set wide search range. Meanwhile, in the case of a moving image configured by images of 320×240 pixels, the maximum moving distance on a pixel basis is 320 in a horizontal direction, and 240 in a vertical direction, so that it is enough to set narrow search range for detecting the moving distance of an image on a pixel basis (or on a ½-pixel basis, or on a ¼-pixel basis) in comparison with the above case, even if the movement of the image is same as the above case. Alternatively, there is a significant difference between the average moving distance in a moving image of a news program shot in a studio and that of a sports program. Thus, depending on type of moving image, the search range can be different. Accordingly, there is a case where it is enough to carry out detection of motion vector on a normal macro block basis without carrying out detection of global motion vector, thereby reducing the calculation amount.

SUMMARY OF THE INVENTION

In order to solve the above deficiencies, the present invention provides an image coding apparatus, in which a detection unit for global motion vector is provided exterior to an image transformer by means of removing high-frequency components after DCT, dropping remainder by quantization, and variable length coding. According to the above configuration, it becomes possible to detect the global motion vector by means of an inputted image before irreversible compression. Moreover, since the detection unit for global motion vector is provided exterior to the image transformer, it becomes possible to easily switch whether or not the detection unit for global motion vector is used upon image transformation. Note that the terms 'provided exterior' may mean a configuration in which hardware devices are physically separated, or a configuration in which the same hardware is operated on software as an external hardware.

As described above, it becomes possible to detect the global motion vector by means of an inputted image before irreversible compression, thereby removing errors in detecting the global motion vector due to the reproduction error of the reference image. Moreover, it becomes possible to easily switch whether or not the detection mechanism for global motion vector is used upon image coding according to the situation, thereby minimizing unnecessary calculation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiments of the present invention will be described hereinbelow with reference to the drawings. The present invention is not to be limited to the above embodiments and able to be embodied in various forms without departing from the scope thereof.

First Embodiment

Concept of First Embodiment

Figure 1:
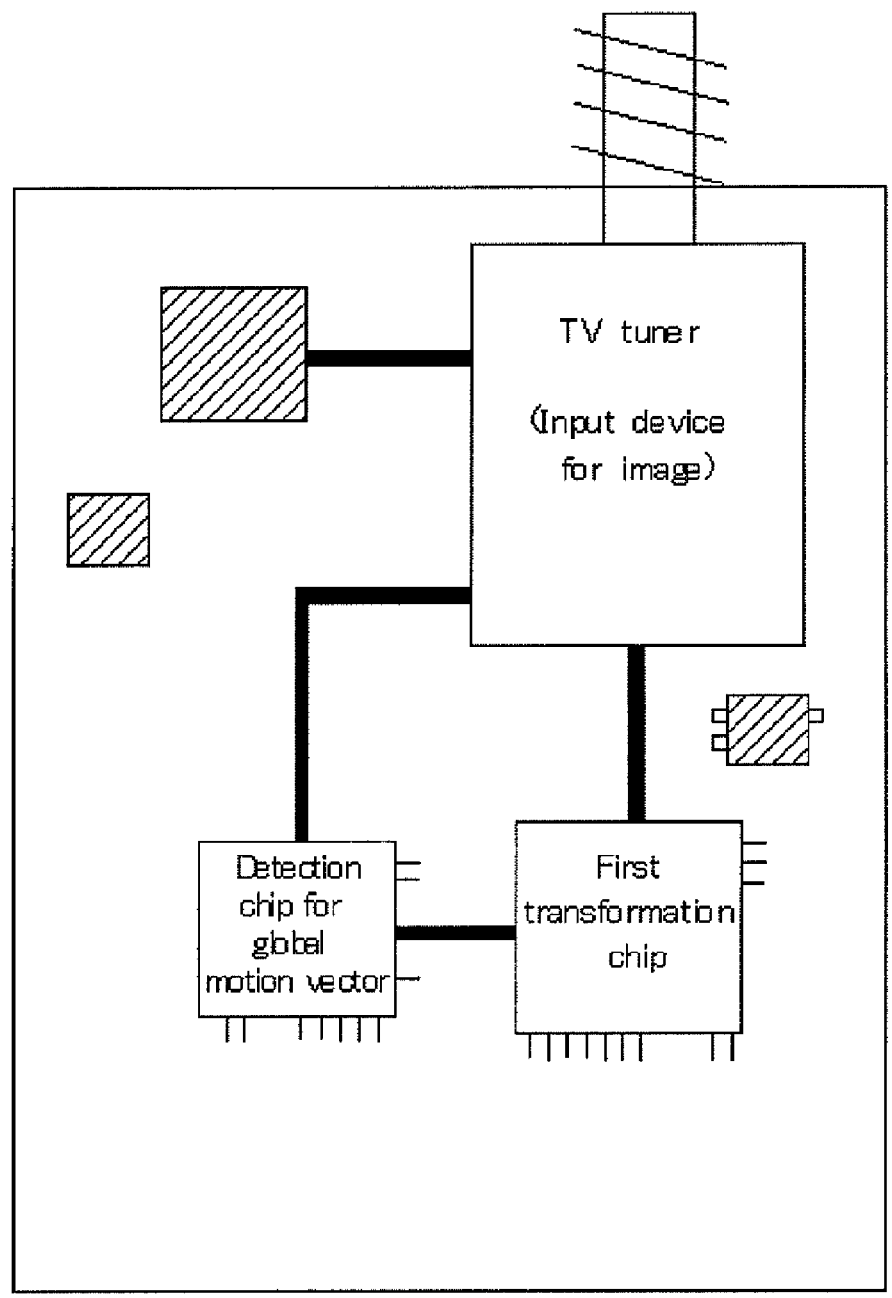
FIG. 1 is a schematic diagram exemplifying equipment implementing an image coding apparatus of a first embodiment.

FIG. 1 is a schematic diagram exemplifying equipment implementing an image coding apparatus (e.g., an image coding board with television tuner) of a first embodiment. As shown in FIG. 1, the image coding apparatus of the first embodiment is an image coding board, in which a second detection chip for global motion vector, which detects the global motion vector and determines a search range, is separately provided exterior to a first transformation chip, which carries out image transformation such as DCT calculation, removing high-frequency components of spatial frequency, quantization, variable length coding, or coding by means of motion vector. Therefore, in the image coding apparatus of the present invention, it becomes possible to directly refer a digital image inputted from the television tuner (image inputting device), not to an inputted image, which has been irreversibly compressed and inversely transformed by the first transformation chip.

Configuration of First Embodiment

Figure 2:
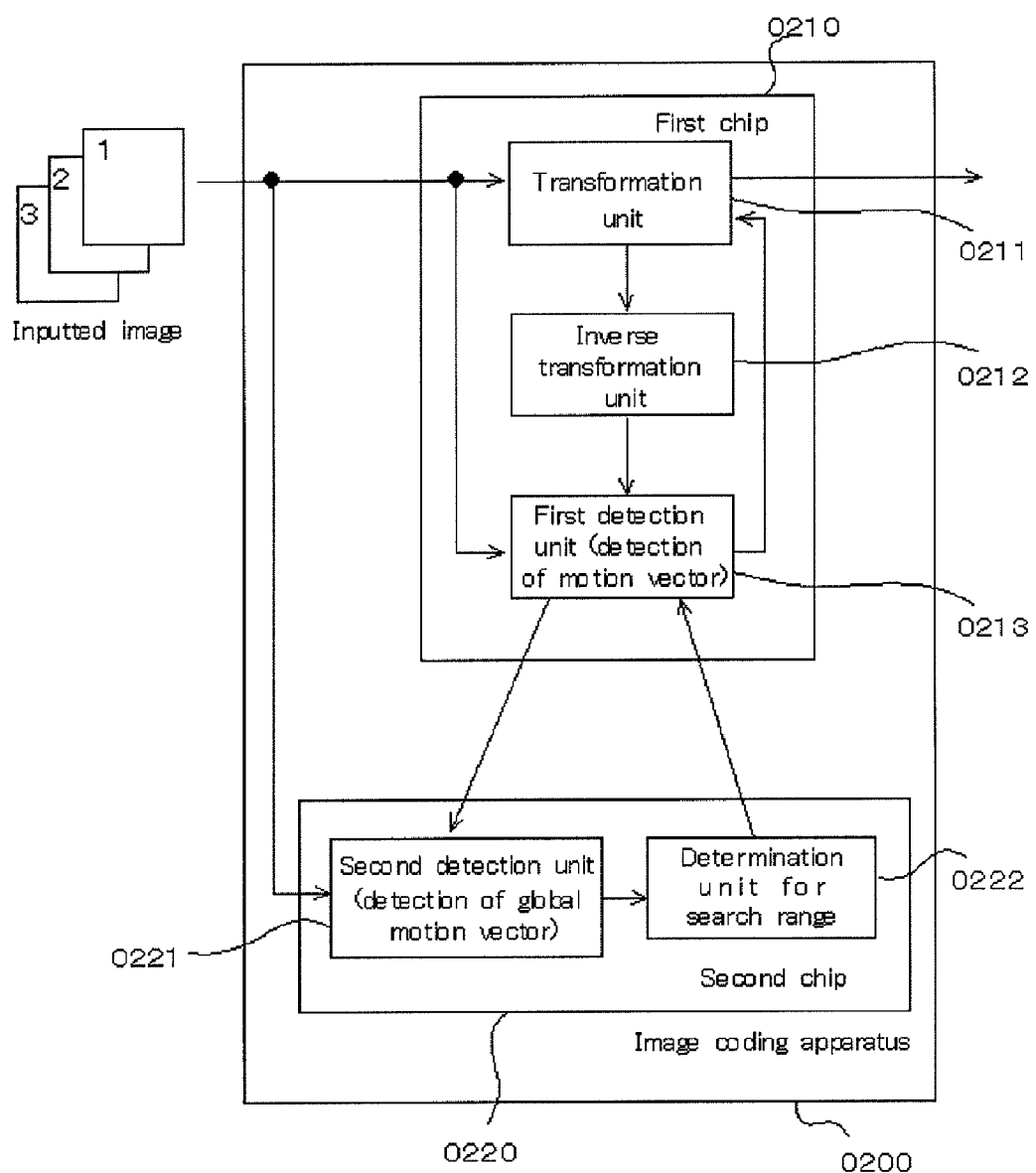
FIG. 2 is a functional block diagram of the image coding apparatus of the first embodiment.

FIG. 2 is a functional block diagram of the image coding apparatus of the first embodiment. As shown in FIG. 2, an 'image coding apparatus' (0200) is an image coding apparatus for coding an inputted image by means of a motion vector, comprising a 'first chip' (0210), a 'second chip' (0220), which are separately arranged. The 'first chip' comprises a 'transformation unit' (0211), an 'inverse transformation unit' (0212), and a 'first detection unit' (0213). The 'second chip' comprises a 'second detection unit' (0221), and a 'determination unit for search range' (0222), and respective processings can be carried out independently. Note that the configuration of the present invention may be a configuration in which the first chip and the second ship are physically separated, or a configuration in which the one hardware chip is separately operated in a software.

Note that, the functional block of the apparatuses described hereinbelow can be implemented by hardware, software, or both hardware and software. Specifically, in the case of using a computer, examples of the hardware component include a CPU, a main memory, a bus, a storage device such as a hard disk or a nonvolatile memory, a storage media such as CD-ROM or DVD-ROM, a reading drive for the above media, a transmission/reception port for various communications and printing device, and other peripheral devices, and a driver program for controlling the above hardware, and other application programs, and an interface for inputting information. The above hard and software are used for sequential execution of programs in the memory by CPU, for processing, storing and outputting of the data inputted via the interface, or for controlling the respective hardware components. Moreover, the present invention can be implemented not only as an apparatus but also as a method thereof. Moreover, a portion of such inventions may be configured as software. Furthermore, a software product used for causing a computer to execute the software, and the recording medium, in which the software is installed, should be included in the technical scope of the present invention (the same applies throughout the entire specification).

The 'transformation unit' (0211) has a function of carrying out transformation for high-efficiency coding of an image. Examples of the 'transformation for high-efficiency coding of an image' include the first image transformation by means of correlation in image (spatial correlation), the second image transformation by means of correlation between times (time correlation), and the third image transformation by means of variable length coding. As to the first image transformation by means of the above-mentioned spatial correlation, for example, DCT (Discrete Cosine Transform) for orthogonal transform of spatial frequency of an inputted image, removing high-frequency components of the image acquired by the DCT, or quantization in which coefficient of the DCT-processed pixel block is divided by a divisor and the remainder is cut, thereby expressing the DCT coefficient only by the quotient. Moreover, detection of motion vector by means of the after-mentioned second detection unit, and the second image transformation based on inter-frame prediction by means of the motion vector are also carried out in the transformation unit.

The 'inverse transformation unit' (0212) has a function of reproducing an image by carrying out inverse transformation of the high-efficiency-coded data of the inputted image transformed by the transformation unit (0211). Examples of the inverse transformation include inverse DCT if the process in the transformation unit is DCT, and inverse quantization if the process is quantization. Note that since the DCT and the quantization, which are general methods for removing high-frequency components as transformation for high-efficiency coding of moving image data, are irreversible transformation, the inputted image is not correctly reproduced by the inverse DCT and the inverse quantization by the inverse transformation unit. Therefore, if the image incorrectly reproduced by the inverse transformation is used upon detecting the global motion vector, the detection of global motion vector can be less accurate. Therefore, in the present invention, as described below, the image (incorrectly) reproduced by the inverse transformation in the inverse transformation unit is not used upon detecting the global motion vector.

The 'first detection unit' (0213) has a function of detecting the motion vector by searching a predetermined search range in the inputted image based on macro block of transformation-inverse transformation-processed image. The 'predetermined search range' is a search range for detecting the motion vector determined by the determination unit for search range based on the global motion vector detected by the after-mentioned second detection unit. Note that the determination process of this predetermined search range will be described in the descriptions of the after-mentioned second detection unit and determination unit for search range. Further, the 'transformation-inverse transformation-processed image' is data of an image reproduced by inverse transformation in the inverse transformation unit (0212) of the coded data of the inputted image transformed in the transformation unit (0211).

Figure 3:
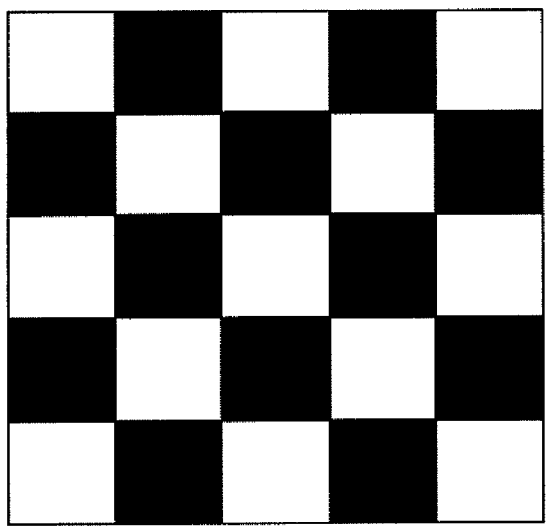
FIGS. 3(a) and 3(b) are schematic diagrams showing an inputted image and transformation-inverse transformation-processed image, which are processed in the image coding apparatus of the first embodiment.
Figure 3:
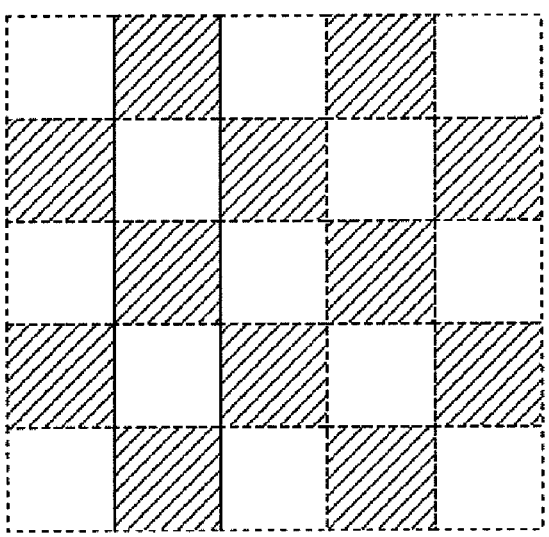

FIG. 3 is a schematic diagram showing an inputted image and transformation-inverse transformation-processed image, which are processed in the image coding apparatus of the first embodiment. As indicated by FIG. 3 (a), in the transformation by means of spatial correlation of image, it is difficult to efficiently carry out transformation in cases where there is drastic change between adjacent pixels, for example, in cases where color changes from white to black like a chessboard. If high compression efficiency is set, as indicated by FIG. 3 (b), the outline cannot be correctly reproduced. Therefore, if this incorrectly reproduced inputted image is referenced upon detecting motion vector for the second image transformation by means of time correlation, in cases where reproduction error is large, the detection accuracy of the motion vector is decreased. In the conventional image coding apparatus, there is a similar problem that the second detection unit is arranged on the first chip, thereby decreasing detection accuracy in detecting the global motion vector. Therefore, in the following configuration of the first embodiment, the detection of the global motion vector in the second detection unit to determine the above-mentioned 'predetermined search range' is carried out directly utilizing the inputted image. Therefore, the second detection unit is provided on the second chip, not on the first chip comprising the above-mentioned transformation unit, inverse transformation unit, and the first detection unit.

The 'second detection unit' (0221) has a function of detecting a global motion vector between the inputted images based on a global macro block. The 'global macro block' is a block larger than the macro block, which is a detecting unit for motion vector in the first detection unit, and the size of the global macro block may be appropriately designed. Therefore, this global motion vector detected based on a global macro block is used for determining the search range for detecting vector by the above-mentioned first detection unit.

Figure 4:
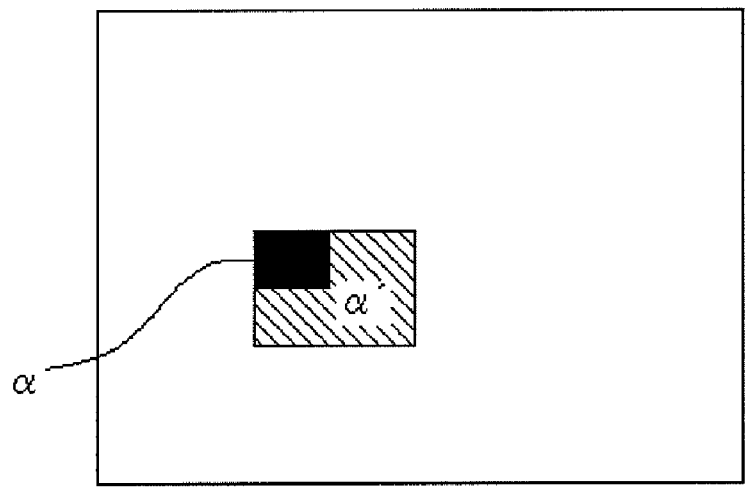
FIG. 4 is a conceptual diagram showing detection process of global motion vector in the second detection unit of the image coding apparatus of the first embodiment.
Figure 4:
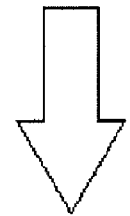
Figure 4:
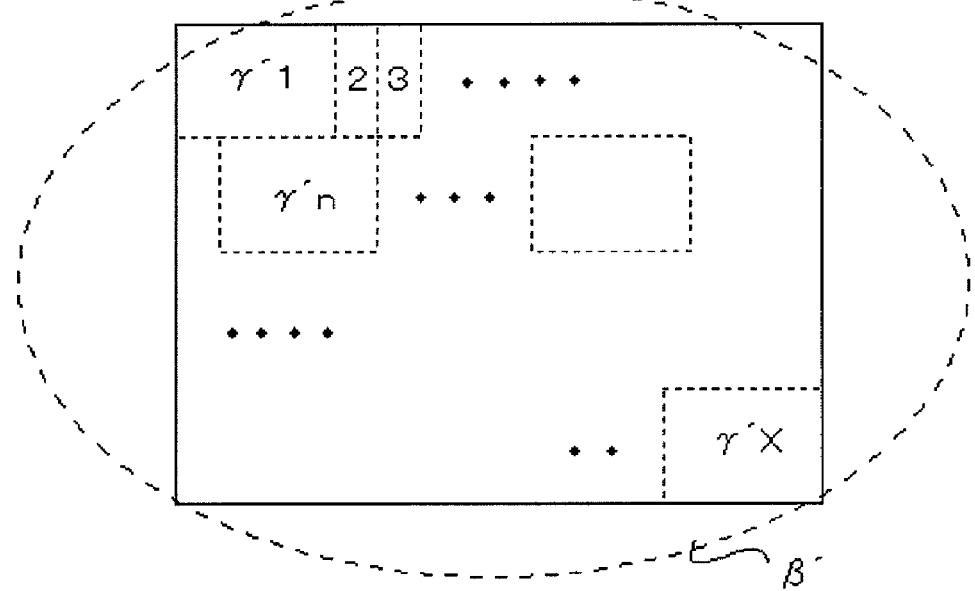

FIG. 4 is a conceptual diagram showing detection process of global motion vector in the second detection unit of the image coding apparatus of the first embodiment. Here, as shown in FIG. 4, for example, detection of the global motion vector in the second detection unit to search for a destination in the frame 1 of the macro block α in the frame (inputted image) 2 by the above-mentioned detection unit 1 will be described. For this purpose, at the outset, identification information 'frame 2' of the inputted image, of which motion vector is to be detected in the first detection unit, coordinate information of the macro block α, and identification information 'frame 1' of the reference inputted image for detecting destination are transmitted from the first chip to the second chip. In the second chip, based on the received identification information and the coordinate information, as indicated in FIG. 4, the global macro block α', which includes the macro block α in the frame 2, is specified. After that, a destination in the frame 1 of the global macro block α' is searched. Then, β including entire frame of the frame 1 is set as a search range, and correlation coefficient between the block γ'1, the same size as the global macro block in the search range, and the global macro block α' is acquired. Specifically, for example, a summation of absolute value of the difference between corresponding pixels in the α' and in the γ'1 is acquired. Therefore, as the correlation coefficient is small, pixels in the α' and in the γ'1 are similar. Search in the search range β' is carried out by moving the block based on a predetermined pixel, so that the correlation coefficient between the respective blocks such as "α' and γ'2", "α' and γ'3", . . . , and "α' and γ'X" are calculated. Therefore, a block having the smallest correlation coefficient is specified as the γ', a destination of movement in the frame 1 of the global macro block α'. Note that the blocks γ'1, γ'2, and so on in the reference inputted image for calculating the correlation coefficients are blocks acquired by moving a block, having the same size as the global macro block, based on the predetermined pixel thin the search range. Therefore, the global motion vector is detected from the moving direction and moving distance to the destination γ' of the global macro block α'. Here, the predetermined pixel corresponds to 1 pixel, ½ pixel, ¼ pixel, 2 pixels, or 4 pixels, and may be specified in accordance with calculation amount and accuracy of detecting vector based on system configuration. Needless to say, the above-mentioned detection process for calculating the correlation coefficients of all blocks within the search range is one of the examples, and so-called log search, in which correlation coefficients of any three blocks are acquired in order to reduce burden of the calculation, thereby narrowing down the destination block based on magnitude correlation, may be used for detecting the global motion vector. Further, as the inputted image for detecting the global motion vector, not only an original image to be an object of coding but also a reduced image of the original image may be used, and the reduction ratio may be appropriately specified in accordance with calculation amount, memory capacity, and image size etc. based on system configuration.

In the present invention, the frame '1' referenced for acquiring the correlation coefficient is not an image inversely transformed after transformation by DCT or quantization etc. Therefore, it becomes possible to carry out accurate comparison of inputted images, thereby accurately detecting global motion vector.

The 'determination unit for search range' (0222) has a function of determining search range of the search by the first detection unit by means of the global motion vector detected by the second detection unit. This determination of the search range is carried out, for example, by a method in which a predetermined range centered around a destination indicated by detected global motion vector is determined as the search range, by a method in which a block as a destination of global macro block detected by the second detection unit, or by a method in which a block generated by enlarging the block at a predetermined magnification is determined as the search range, etc.

Thus, information indicating the search range determined based on the global motion vector, which is more accurate than that of the related art, is transmitted to the first detection unit, so that the first detection unit can detect the motion vector on a macro block basis within the received search range. Accordingly, in the detection of motion vector by the first detection unit, it becomes possible to narrow down the search range for destination of the macro block, thereby reducing processing burden of the entire apparatus. Note that the determination unit for search range may be equipped with the first chip, not with the second chip. The reason for this is that it is possible to detect global motion vector, which is more accurate than that of the conventional method, so long as the second detection unit is equipped with another chip separate from the first chip.

Hardware Configuration of First Embodiment

Figure 5:
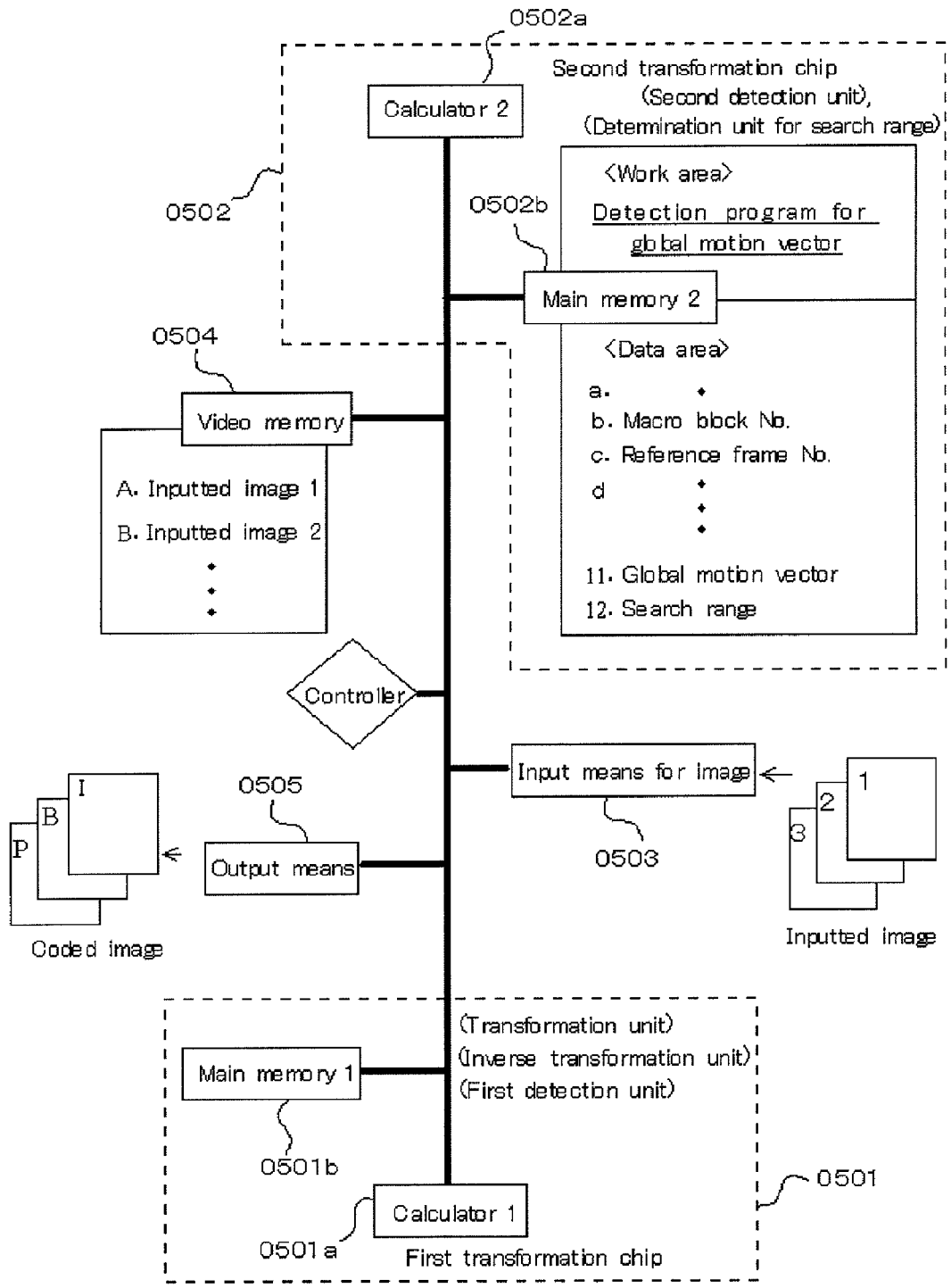
FIG. 5 is a diagram exemplifying a hardware configuration of the image coding apparatus of the first embodiment.

FIG. 5 is a diagram exemplifying a hardware configuration of the image coding apparatus of the first embodiment. The respective functions of hardware components in the detection process of global motion vector will be described with reference to FIG. 5. Note that the case where a preceding frame is specified as a reference frame, and an image used for detecting global motion vector remains the inputted image as the object of coding without being processed by reduction etc. As shown in FIG. 5, the image coding apparatus of the first embodiment includes a 'first transformation chip' (0501), comprising the first detection unit, the transformation unit, and the inverse transformation unit, and a 'second transformation unit' (0502), comprising the second detection unit and the determination unit for search range, further comprise a 'calculator' and a 'main memory' respectively, and are separately arranged. In addition, an 'inputting means for image' (0503) for inputting an image as an object of high-efficiency coding, a 'moving image memory' (0504) for storing the inputted image, and an 'outputting means' (0505) for outputting the image coded by the transformation chip to a storage device etc. are further comprised. Moreover, they are mutually connected via data communication path such as a bus, and carry out transmission/reception or processing of information.

Further, the 'moving image memory' may be shared by the first transformation chip and the second transformation chip, or each of them may comprise a moving image memory, respectively (in FIG. 5, shared moving image memory is indicated). Further, the respective 'main memory' in the first and the second transformation chips provides a working area for a program executed by a calculator, and a data area for storing data to be processed by the program. Therefore, a plurality of memory addresses are assigned to the 'moving image memory' and the 'main memory', and the program executed by the 'calculator' specifies a memory address and carries out access, thereby mutually exchanging and processing data.

Here, the image as an object of high-efficiency coding is inputted from the 'inputting means for image. Examples of this inputted image include moving image data, which is generated by coding without compression from analog broadcast wave received by TV tuner, or moving image data, which is recorded by a digital moving image camera, and is coded without compression. Alternatively, coded moving image, which is generated by decoding high-efficiency coded moving image data, may be used. Then, the inputted images configuring the moving image are stored to a predetermined memory address of moving image memory via system bus, for example, in the manner that the inputted image 1 (first frame of the moving image data) is stored into the memory address A, and the inputted image 2 (second frame of the moving image data) is stored into the memory address B.

At the outset, the program for detecting global motion vector of the second transformation chip is executed by the calculator 2, and the global motion vector of respective global macro blocks in the inputted image 2 for the inputted image 1 is detected. For this purpose, for example, based on information indicating a preliminarily specified pixel size of the global macro block etc., coordinate information of the global macro block α' as an object for detecting global motion vector is sequentially specified, and is stored into the memory address d of the main memory 2. Subsequently, in order to calculate the correlation coefficient, pixel information of the global macro block is acquired. Specifically, based on the identification information '2' of the inputted image stored into the memory address a, and on the coordinate information of the global macro block stored into the memory address d, an instruction to 'correlate the pixel information within the global macro block α' in the inputted image '2' stored in the moving image memory with the respective pixel identification information, and store them into the main memory 2' is transmitted from the calculator 2, and is executed.

Similarly, specifying coordinate information of the blocks (in the above example, γ'1, γ'2, . . . , γ'X) of the inputted image '1', acquiring pixel information based on the specification, and storing the pixel information into the main memory 2 are carried out. Subsequently, in accordance with an instruction to 'acquire difference value between corresponding pixels in "α' and γ'1" based on the pixel identification information, calculate a summation of the absolute values thereof, correlate the calculation results (correlation coefficients) with the identification information of the blocks in the inputted image '1' as an object of calculation, and store them into the memory address e of the main memory 2', calculation in the calculator, and storage of the calculation results into the memory address e are carried out. Similarly, calculations respectively regarding "α' and γ'2", "α' and γ'3", . . . , and "α' and γ'X" are carried out, and the calculation results are stored into the respective memory addresses f, g, . . . , and x of the main memory.

Subsequently, in accordance with an instruction to 'carry out magnitude-comparison of the calculation results (correlation coefficients) stored in the memory addresses f, g, . . . , and x of the main memory 2, and specify the smallest correlation coefficient', the magnitude-comparison in the calculation of the calculator 2 is carried out, thereby specifying the smallest correlation coefficient. Subsequently, in accordance with an instruction to 'acquire identification information of a block having the specified correlation coefficient, and store it to the memory address 10 of the main memory', the identification information of the block correlated with the correlation coefficient is acquired as the identification information "γ'" indicating a destination block in the frame 1 of the global macro block "α'", and is stored into the memory address 10 of the main memory 2. Subsequently, in accordance with an instruction to 'calculate global motion vector from central coordinate information of the block specified as a destination of the global macro block, and store it into the memory address 11 of the main memory 2, the global motion vector is calculated from the respective central coordinate information in the calculation by the calculator 2, and is stored into the memory address 11 of the main memory 2. Subsequently, the above process, as to the all of global macro blocks in frame 2, is carried out, thereby generating a global motion vector table of the frame 2 for the frame 1. Moreover, if the frame 3 is inputted, the above process for the frame 2 is carried out, thereby generating a global motion vector table of the frame 3 for the frame 2.

Subsequently, detection of motion vector based on a macro block by means of the global motion vector stored in a memory etc. as the above generated table is carried out. For this purpose, the first image transformation in the calculation by the calculator 1 of the first transformation chip, therefore, DCT or quantization etc. of the inputted image 1 is carried out. Subsequently, DCT or quantization etc. of the inputted image 2 is carried out. Upon this process, for example, the identification information '2' of the frame (inputted image) as an object of detecting the motion vector, identification information and coordinate information of the macro block α, and the identification information '1' of a reference frame for detecting the motion vector are specified, and are transmitted to the second transformation chip via a system bus.

Subsequently, the identification information and the coordinate information thus transmitted are stored in the memory address b and c of the main memory, according to the information as key, search of global motion vector table is carried out by CPU. Consequently, in the search, the global motion vector of the global macro block "α'" in the frame 2 to the frame 1 is read from the global motion vector table, and based on the global motion vector, calculation of the predetermined search range is carried out. Therefore, information indicating the calculated predetermined search range etc. is transmitted to the first transformation chip via bus etc.

Subsequently, in the first chip, detection of the motion vector of the macro block "α'" within the received predetermined search range, and based on the detected motion vector, high-efficiency coding of the inputted image is carried out. Note that, in cases where the calculators 1 and 2 of the respective chips are physically separated, flow of information processed by the respective chips may be controlled by a control unit etc., so that conflict between the flows do not occur on the transmission/reception path of the information such as a bus.

Processing Flow of First Embodiment

Figure 6:
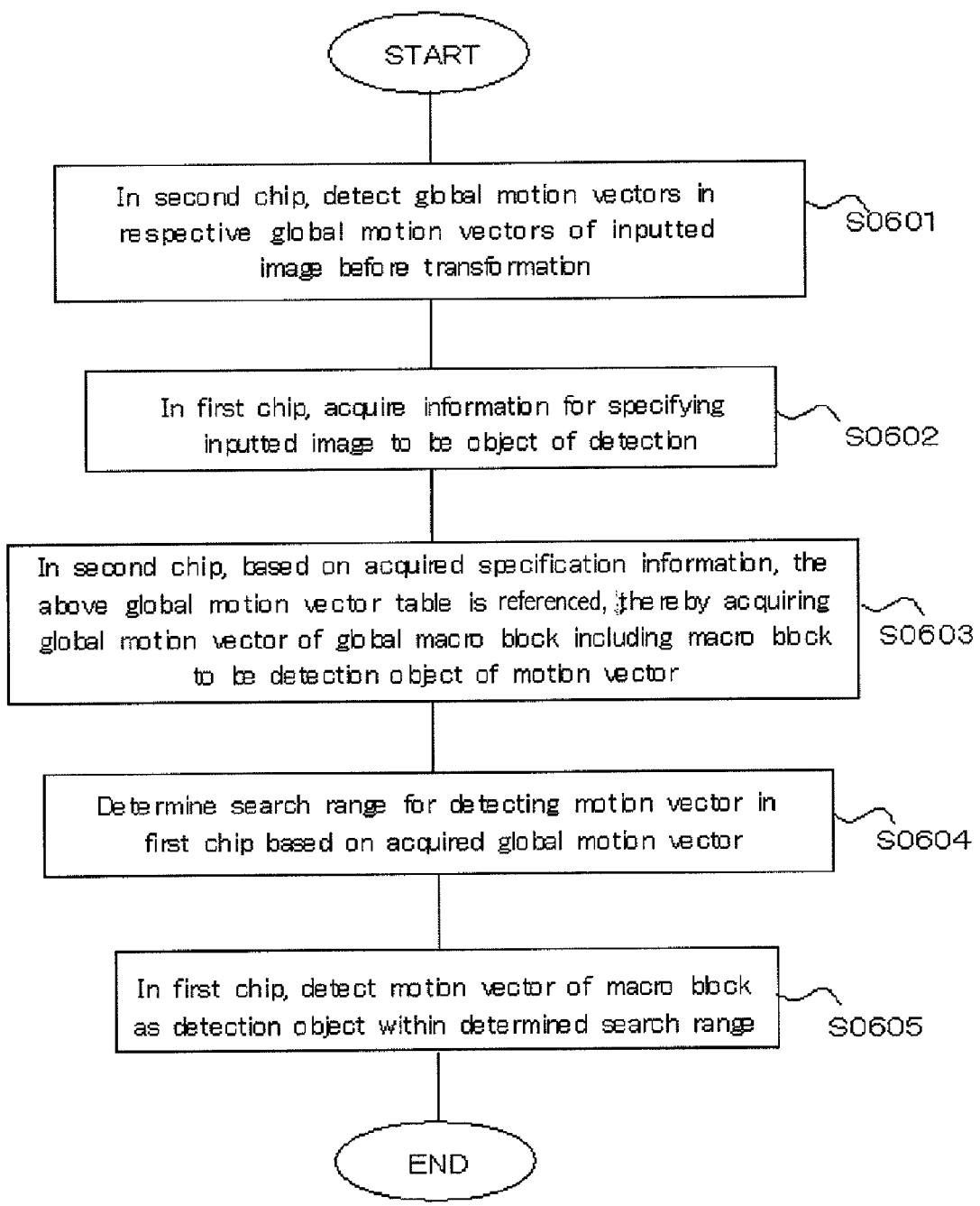
FIG. 6 is a flowchart showing processing in the image coding apparatus of the first embodiment.

FIG. 6 is a flowchart showing processing in the second chip of the image coding apparatus of the first embodiment. Note that the following steps may be processing steps configuring a program, recorded in a medium, for controlling a computer. As shown in FIG. 6, at the outset, in the second chip, the global motion vector of the respective global macro block in the inputted images before transformation are detected respectively, thereby generating the global motion vector table (step S0601). Subsequently, the inputted image as the detection object, the reference inputted image, and information for specifying a coordinate of macro block etc., in the detection of motion vector in the first chip are acquired in the second chip (step S0602). Subsequently, in the second chip, based on the acquired specification information, the above global motion vector table is referenced, thereby acquiring the global motion vector of the global macro block including the macro block to be the detection object of motion vector (step S0603). Based on the global motion vector, the search range for the detecting motion vector in the first chip is determined (step S0604). Subsequently, in the first chip, a motion vector of the macro block as the detection object is detected within the determined search range (step S0605).

Brief Description of Effects of First Embodiment

As described above, according to the apparatus of the first embodiment, it becomes possible to directly refer to an inputted image, not an inputted image processed by irreversible compression and by inverse transformation. Accordingly, it becomes possible to remove errors in detecting the global motion vector due to the reproduction error of the reference image, thereby enabling accurate detection of global motion vector.

Second Embodiment

Concept of Second Embodiment

It is highly possible to reduce the calculation amount of a moving image having small moving distance between images such as news moving image shot in a studio without using the global motion vector. Therefore, the image coding apparatus of the second embodiment according to the first embodiment further has a function of determining whether or not global motion vector is utilized in such a situation. It easily becomes possible to code the inputted image not by means of the global motion vector but by means of motion vector by arranging the second detection unit outside the image-coding chip using the motion vector.

Configuration of Second Embodiment

Figure 7:
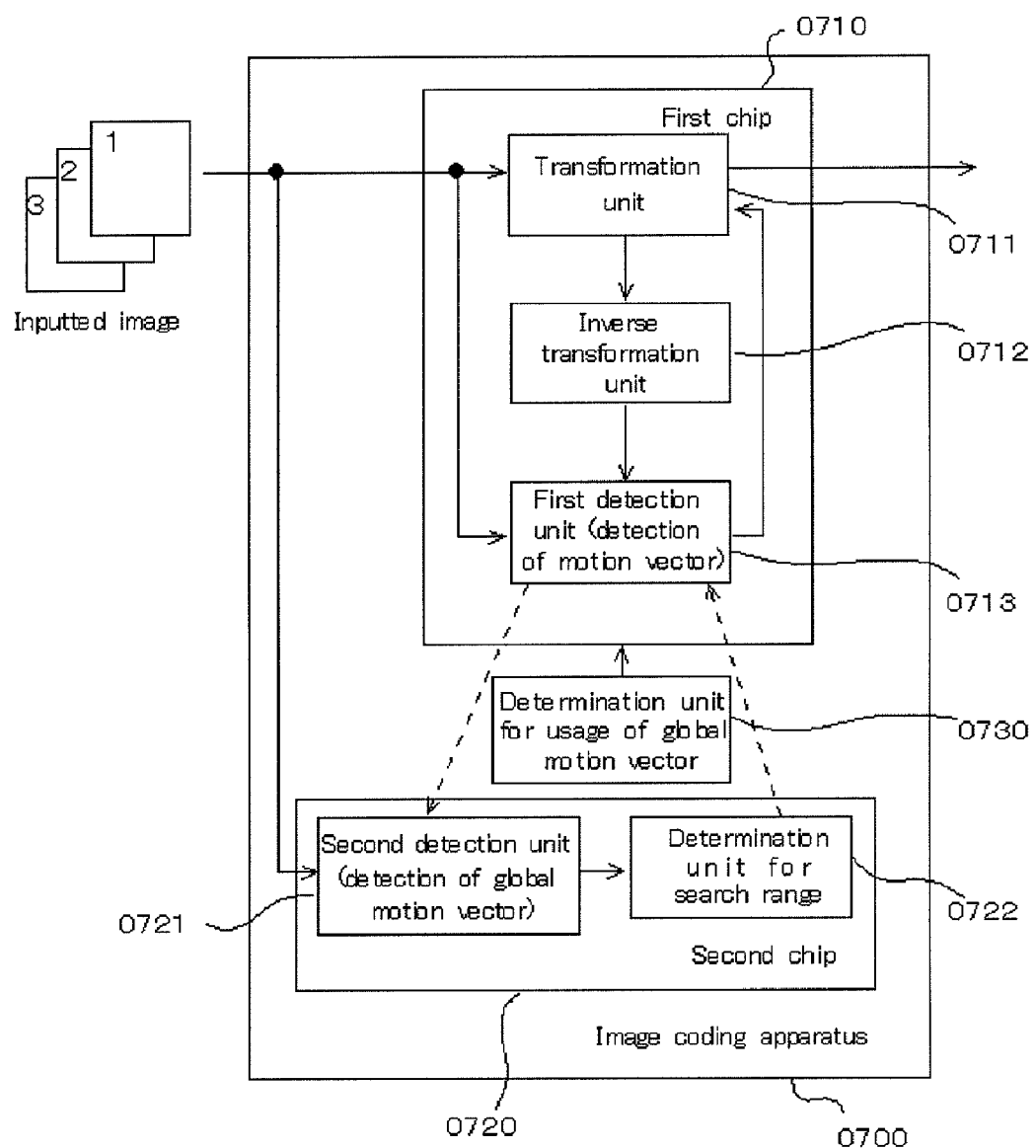
FIG. 7 is a functional block diagram of an image coding apparatus of a second embodiment.

FIG. 7 is a functional block diagram of the image coding apparatus of the second embodiment. As shown in FIG. 7, an 'image coding apparatus' (0700) is based on the first embodiment, and comprises a 'first chip' (0710), a 'second chip' (0770), which are separately arranged. The 'first chip' comprises a 'transformation unit' (0711), an 'inverse transformation unit' (0712), and a 'first detection unit' (0713). The 'second chip' comprises a 'second detection unit' (0721), and a 'determination unit for search range' (0722), and respective processes can be carried out independently. Note that the above functional blocks have been described in the first embodiment, so that the descriptions thereof are omitted. In addition, the image coding apparatus of the second embodiment further comprises a 'determination unit for utilization of global motion vector' (0730).

The 'determination unit for utilization of global motion vector' (0730) has a function of determining whether or not the global motion vector is utilized. Examples of the determination include the above-mentioned determination according to moving image content such as news program or sports program, and the determination according to image size of moving image after-mentioned in the third embodiment. Further, examples of the information as the determination standard include information such as moving image content to be inputted by a user via an interface, and information of program category acquirable from program listing in the case of recorded moving image of broadcasted program. Alternatively, assuming that unmoving objects such as background normally exist around a central portion in a moving image, a configuration, in which a global motion vector of the global macro block in the central portion is detected, and if the moving distance thereof is equal to or less than a threshold, it is determined to not utilize global motion vector as to the entire image, may be used.

The determination unit for utilization of global motion vector is configured, for example, by an interface for inputting by user or an interface for acquiring information and a CPU, and may carry out determination whether or not the global motion vector is utilized by the CPU according to the information (e.g., identification information indicating category of moving image content) acquired via the interface. Note that the terms 'not utilize the global motion vector' may mean that detection of the global motion vector is not carried out in the second detection unit, or may mean that the detection is carried out in the second detection unit, but the detected global motion vector is not transmitted to the determination unit for search range. Alternatively, the terms may mean that the transmission to the determination unit for search range is carried out, but the determination on the search range is not carried out in that unit, or may mean that the determined search range is not transmitted to the first detection unit to detect the motion vector. Further, the search range in the first detection unit in such case may include the entire inputted image, or may be a predetermined search range.

Processing Flow of Second Embodiment

Figure 8:
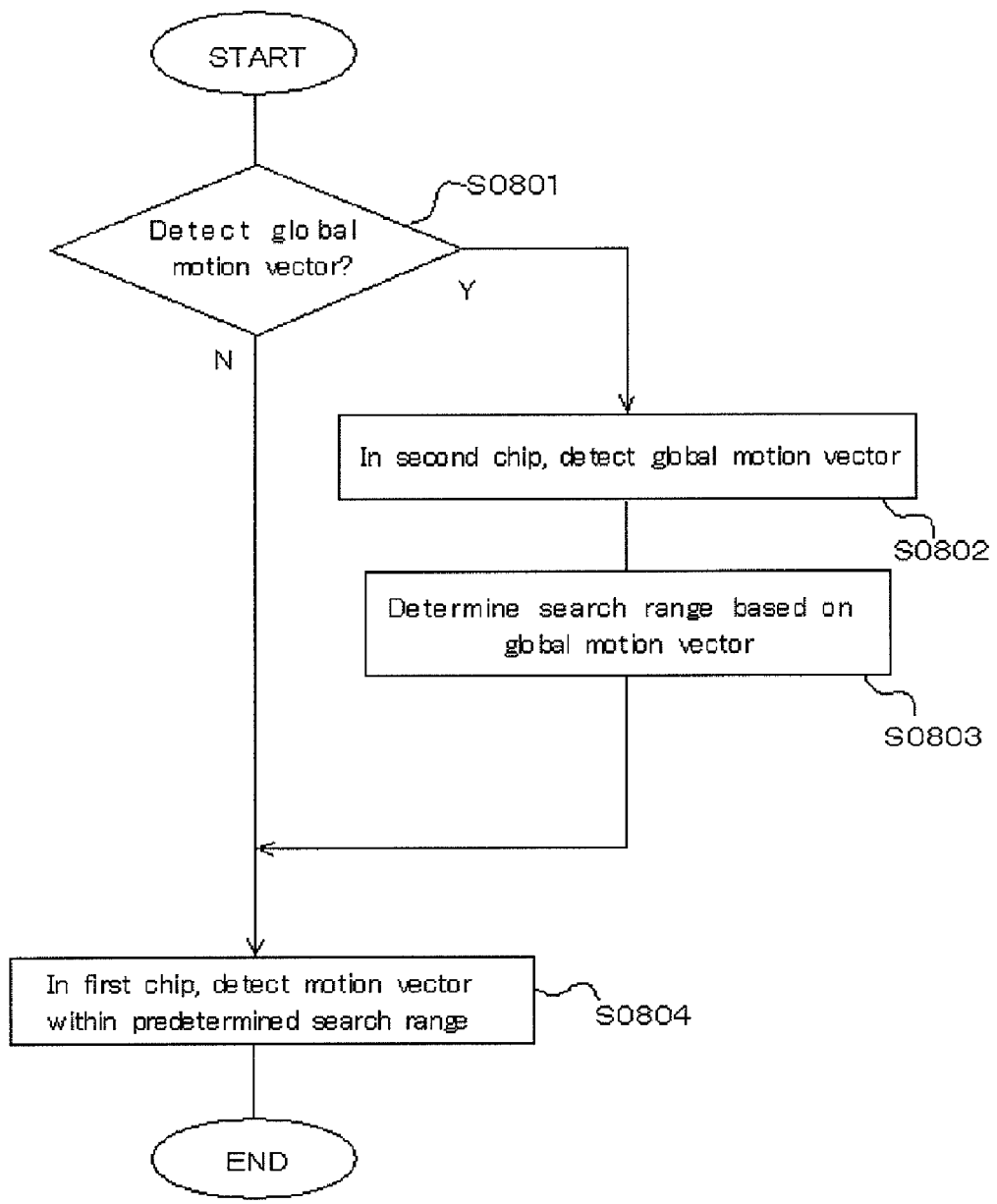
FIG. 8 is a flowchart showing processing in the image coding apparatus of the second embodiment.

FIG. 8 is a flowchart showing processing in the image coding apparatus of the second embodiment. The following steps may be processing steps recorded in a medium and configuring a program for controlling a computer. As shown in FIG. 8, at the outset, it is determined whether or not detection of the global motion vector is carried out (step S0801). Note that the information as a standard of the determination may be various information such as the above-mentioned category information or the motion vector information of the central portion. Further, the information may be acquired through various methods such as input via the interface or automatic acquisition from an electronic program listing. Further, in cases where the detection result indicates that the global motion vector is utilized, as described in the first embodiment, detection of the global motion vector (step S0802), and determination of the search range based on the result (step S0803) are carried out in the second chip. Therefore, based on the determined search range, the search is carried out, thereby detecting motion vector (step S0804).

In cases where the detection result indicates that the global motion vector is not utilized, for example, the detection of the global motion vector and the determination of the search range are not carried out, and the entire image is specified as the search range, thereby detecting the motion vector of the macro block in the first chip (step S0804).

Brief Description of Effects of Second Embodiment

As described above, according to the apparatus of the second embodiment, it becomes possible to change whether or not the global motion vector is detected according to situation. Therefore, it becomes possible to reduce unnecessary calculation of the global motion vector in detecting vector of the macro block. Accordingly, it becomes possible to reduce the burden of the calculation of the apparatus, thereby reducing power consumption and environmental burdens.

Third Embodiment

Concept of Third Embodiment

Figure 9:
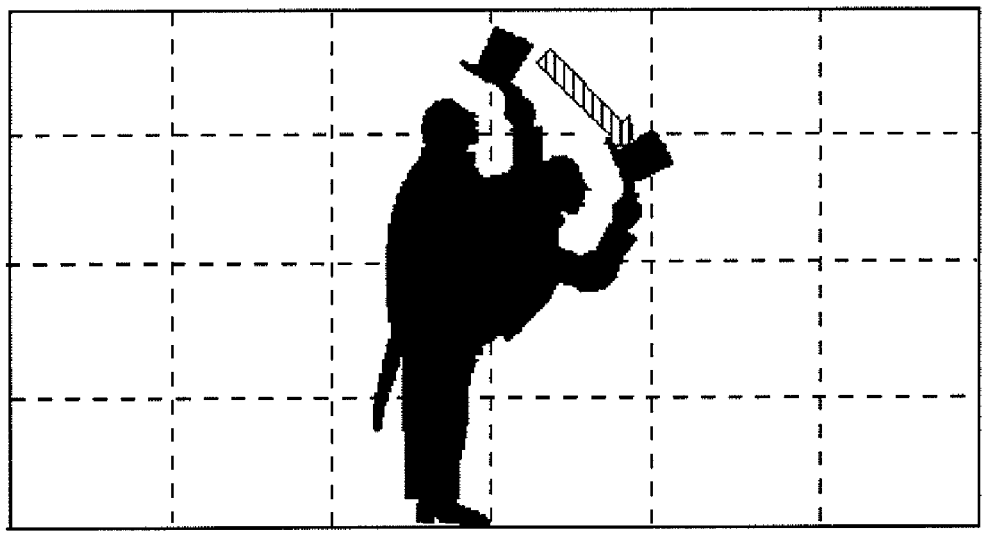
FIGS. 9(a) and 9(b) are schematic diagrams diagram showing a change according to image size of an image in an image coding apparatus of a third embodiment.
Figure 9:
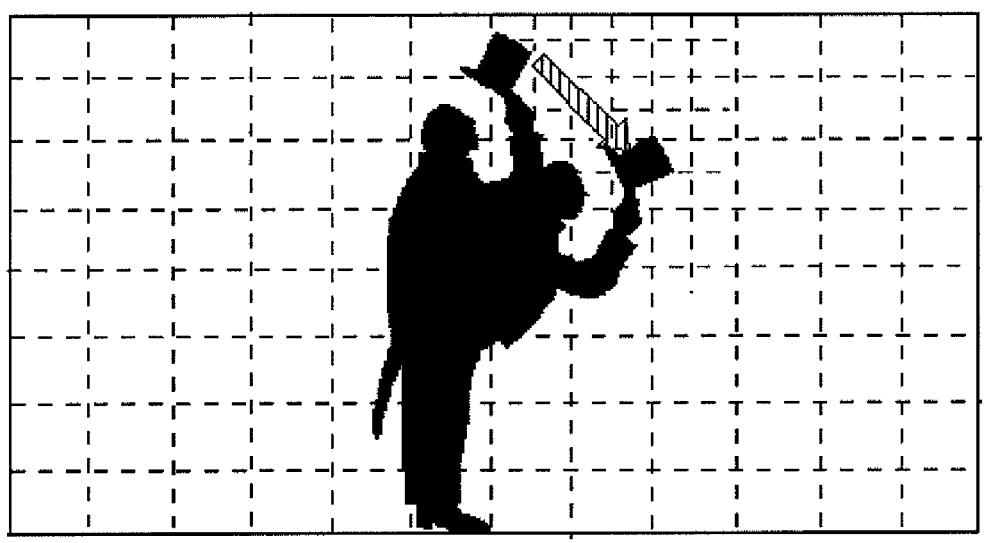

The image coding apparatus of the third embodiment is based on the second embodiment and carries out the determination by the determination unit for utilization of global motion vector further based on the image size. FIG. 9 is a schematic diagram showing a determination according to image size. As shown in FIG. 9, comparing the moving image (a), of which image size is '320×240', with the moving image (b), of which image size is '1920×1080', both include the same object's action, bowing a head and bending the upper body, but the moving distance of the upper body, indicated by perforated lines, on a pixel basis in the moving image (b) is far greater than that of in the moving image (a). Moreover, in 2005, in the detection of motion vector in compression transformation of moving image, the search is carried out based on ½ pixel or ¼ pixel, so that the amount of search becomes greater. As described above, the search range of the motion vector changes depending on the image size even in the same moving image. Therefore, the image coding apparatus of the third embodiment is equipped with the function of determining not to utilize the global motion vector upon compression and transformation in the case of moving image data having image size, in which search range is not large based on a pixel (or ½ pixel or ¼ pixel). Consequently, the processing load is reduced and the processing speed is improved.

Configuration of Third Embodiment

Figure 10:
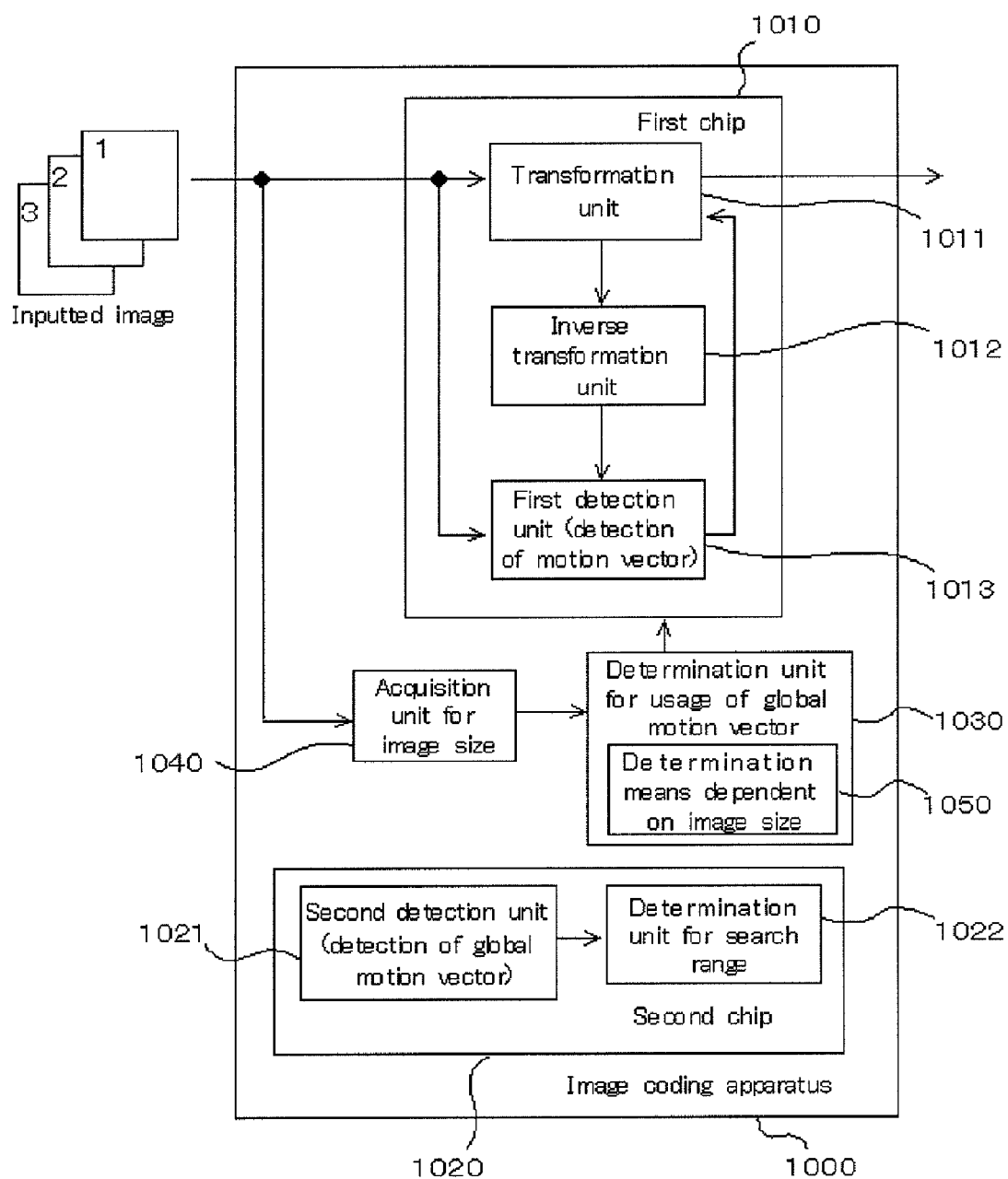
FIG. 10 is a functional block diagram of the image coding apparatus of the third embodiment.

FIG. 10 is a functional block diagram of the image coding apparatus of the third embodiment. As shown in FIG. 10, an 'image coding apparatus' (1000) is based on the second embodiment, and comprises a 'first chip' (1010), a 'second chip' (1010), which are separately arranged, and further comprises a 'determination unit for utilization of global motion vector' (1030). The 'first chip' comprises a 'transformation unit' (1011), an 'inverse transformation unit' (1012), and a 'first detection unit' (1013). The 'second chip' comprises a 'second detection unit' (1021), and a 'determination unit for search range' (1022), and respective processes can be carried out independently. Note that the above functional blocks have been described in the first and second embodiments, so that the descriptions thereof are omitted. In addition, the image coding apparatus of the third embodiment further comprises an 'acquisition unit for image size' (1040), and the acquisition unit for image size further comprises a 'determination means dependent on image size' (1050).

The 'acquisition unit for image size' (1040) has a function of acquiring image size of the inputted image. Note that the image size may be acquired, for example, from its file information upon acquiring moving image. Further, the 'image size' may be number of pixels configuring the inputted image, or may be data amount in cases where the data amount of one pixel is fixed.

The 'determination means dependent on image size' (1050) has a function of carrying out said determination based on the image size acquired by the acquisition unit for image size (1040). For example, a method, in which 'threshold of vertical size of a moving image' or 'threshold of horizontal size of a moving image' etc. are preliminarily set, so that the image size acquired in the acquisition unit for image size is compared with the preliminarily set thresholds in calculator, thereby carrying out the determination, is cited.

Hardware Configuration of Third Embodiment

Figure 11:
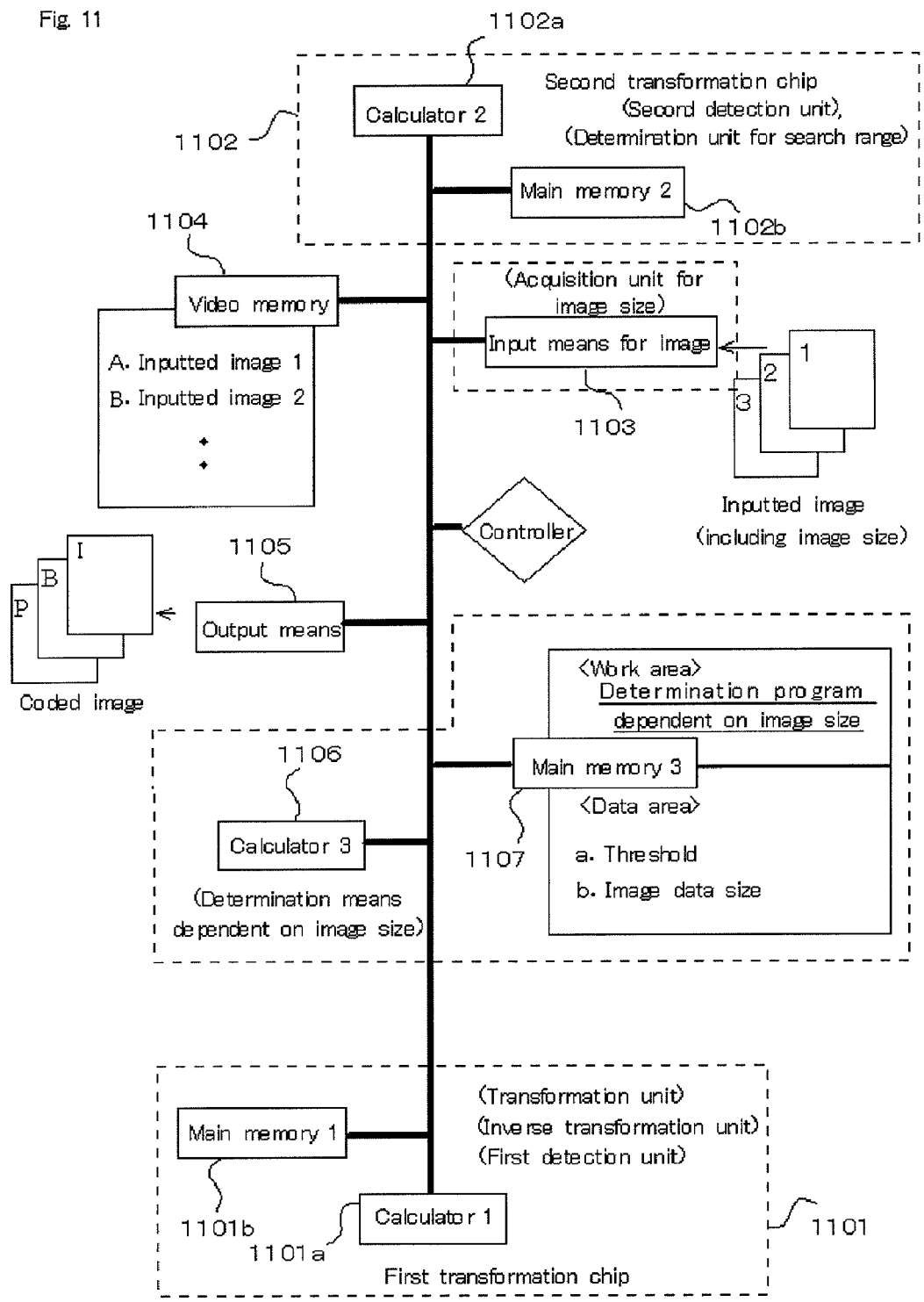
FIG. 11 is a diagram exemplifying a hardware configuration of the image coding apparatus of the third embodiment.

FIG. 11 is a diagram exemplifying a hardware configuration of the image coding apparatus of the third embodiment. The respective functions of hardware components in determination process for utilization of the global motion vector based on the image size will be described with reference to FIG. 11. As shown in FIG. 11, similar to the first embodiment, the image coding apparatus of the third embodiment includes a 'first transformation chip' (1102), comprising the first detection unit, the transformation unit, and the inverse transformation unit, and a 'second transformation unit' (1102), comprising the second detection unit and the determination unit for search range, further comprise a 'calculator' and a 'main memory' respectively, and are separately arranged. In addition, an 'inputting means for image' (1103) for inputting an image as an object of high-efficiency coding, a 'moving image memory' (1104) for storing the inputted image, and an 'outputting means' (1105) for outputting the image coded by the transformation chip to a storage device etc. are further comprised. Moreover, they are mutually connected via data communication path such as a bus, and carry out transmission/reception or processing of information. In addition, in the third embodiment, a calculator 3, for carrying out determination on usage of the global motion vector, and a main memory 3, of the calculator 3 are connected via the system bus etc.

Needless to say, the each 'main memory' has a work area for operating program executed by the calculator, and data area for storing the data processed by the program. Further, a plurality of memory addresses are assigned to the 'moving image memory' and to the 'main memory', so that the program executed by the 'calculator' specifies the memory address, and accesses it, thereby mutually processing the data.

Here, image to be coded is inputted from the 'inputting means for image'. Then, upon acquiring the inputted image, image data size '720×480 (pixels)' of the moving image included in the file information of the moving image data is acquired. Then, the determination program dependent on image size is executed according to the acquisition of the inputted image as a trigger, and according to the command, this information of the image data size '720×480' of the moving image is stored in the memory address b of the main memory 3. In addition, the information of the preliminarily stored threshold such as 'horizontal size 640', and 'vertical size 480' is also stored in the memory address a of the main memory 3. Subsequently, in accordance with the command instructing to 'compare the magnitude of the numerical values stored in the memory addresses a and b in the main memory 3, thereby determining whether the image data size is below the threshold', the calculator 3 carries out comparing magnitude of the numerical value data. In addition, in accordance with the command instructing to 'transmit a command instructing execution of detection process of global motion vector in the second chip in cases where the result of the magnitude-comparison indicates that the image data size is greater than the threshold, or transmit a command instructing non-execution of detection process of global motion vector in the second chip in cases where the result of the magnitude-comparison that the image data size is smaller than the threshold', transmission of the command in accordance with the determination result of the magnitude-comparison is carried out.

Processing Flow of Third Embodiment

Figure 12:
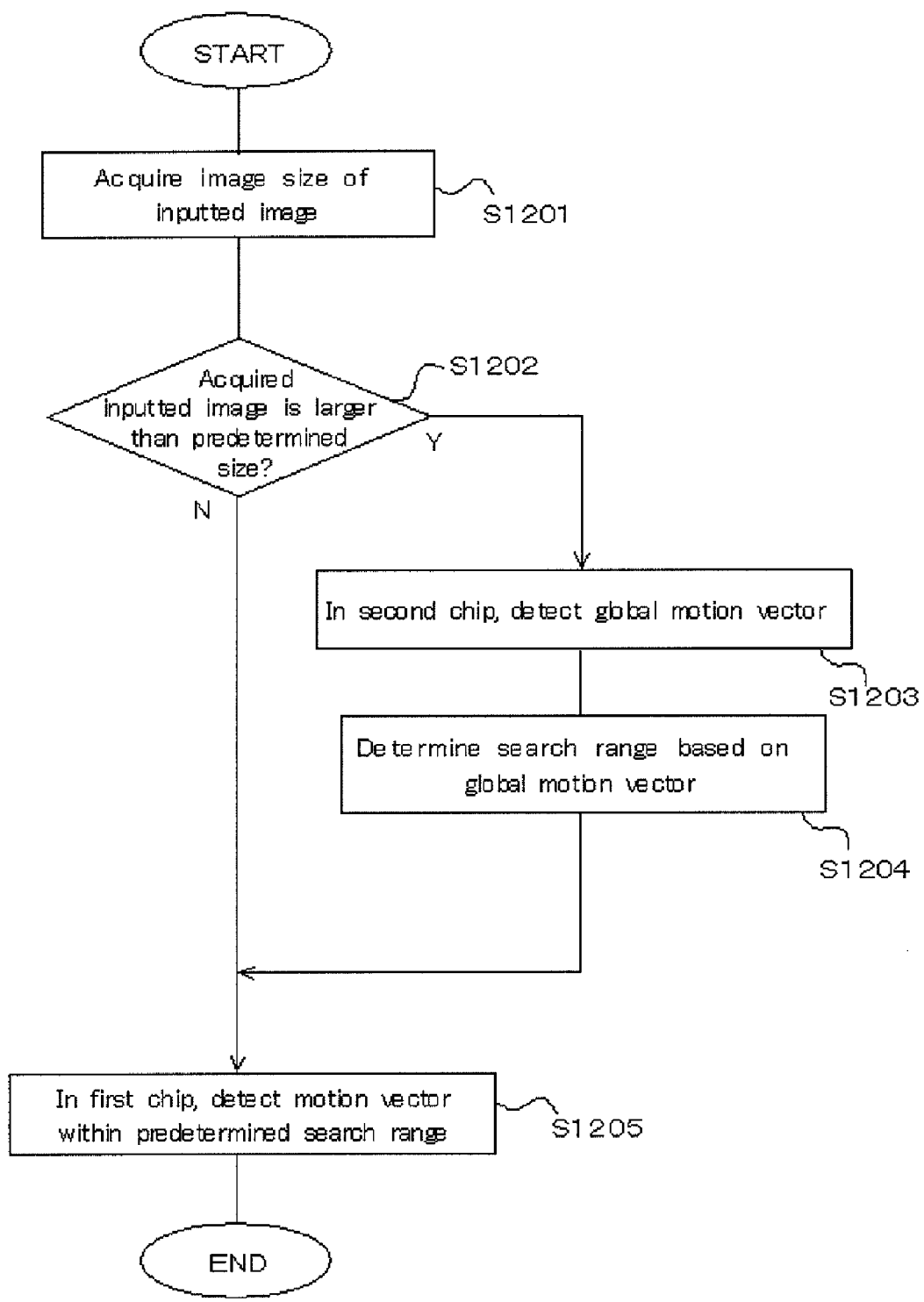
FIG. 12 is a flowchart showing processing in the image coding apparatus of the third embodiment.

FIG. 12 is a flowchart showing the processing in the image coding apparatus of the third embodiment. The following steps may be processing steps recorded in a medium and configuring a program for controlling a computer. As shown in FIG. 12, at the outset, the image size of the inputted image is acquired (step S1201). Subsequently, it is determined whether the acquired image size is larger than the predetermined size (threshold), which has been preliminarily set (step S1202). Here, if the determination result indicates that it is larger than the threshold, the detection of the global motion vector is carried out (step S1203), and based on this, the search range is determined (step S1204). After that, based on the determined search range, search is carried out, thereby detecting motion vector (step S1205).

Meanwhile, if the determination result indicates that it is smaller than the threshold, for example, the detection of the global motion vector and the determination of the search range are not carried out, and the entire image is set as the search range, so that the detection of the motion vector of the macro block is carried out in the first chip (step S1205).

Brief Description of Effects of Third Embodiment

As described above, according to the apparatus of the third embodiment, it becomes possible to carry out switching as to whether the detection of the global motion vector in accordance with the image size is carried out according to circumstances. Since the information indicating the image size is normally included in the file information of the moving image data, this information indicating the image size is automatically acquired. Accordingly, it becomes possible to automatically omit calculation, which possibly becomes unnecessary for the detection of the motion vector of macro block. Therefore, it becomes possible to reduce burden of the calculation of the apparatus, thereby reducing power consumption and environmental burdens.

Another Third Embodiment

Additionally, the image coding apparatus of the third embodiment may further comprise a 'determination unit for size of global macro block'. The 'determination unit for size of global macro block' has a function of determining size of a global macro block based on the image size acquired by the acquisition unit for image size. This determination is carried out, for example, by a determination method by means of a correspondence table such as a table, in which in the case of image size '320×240' pixels, a size of a global macro block is set to '32×24' pixels, or a table, in which in the case of image size '1920×1080' pixels, a size of a global macro block is set to '96×72' pixels, or by a determination method for size of a macro block by means of a predetermined function f(x), in which image size is a parameter x. Therefore, the image coding apparatus of another third embodiment further has a function of determining the global macro block according to the image size of the inputted image, so that it becomes possible to omit unnecessary calculation and to reduce the processing load. In addition, reduction ratio is determined by means of the value calculated by the 'determination unit for size of global macro block', a reduced image is generated based on the reduction ratio from the original image to be coded, and global motion vector is detected by means of the image, thereby reducing amount of processing and amount of memory to be used.

Fourth Embodiment

Concept of Fourth Embodiment

Figure 13:
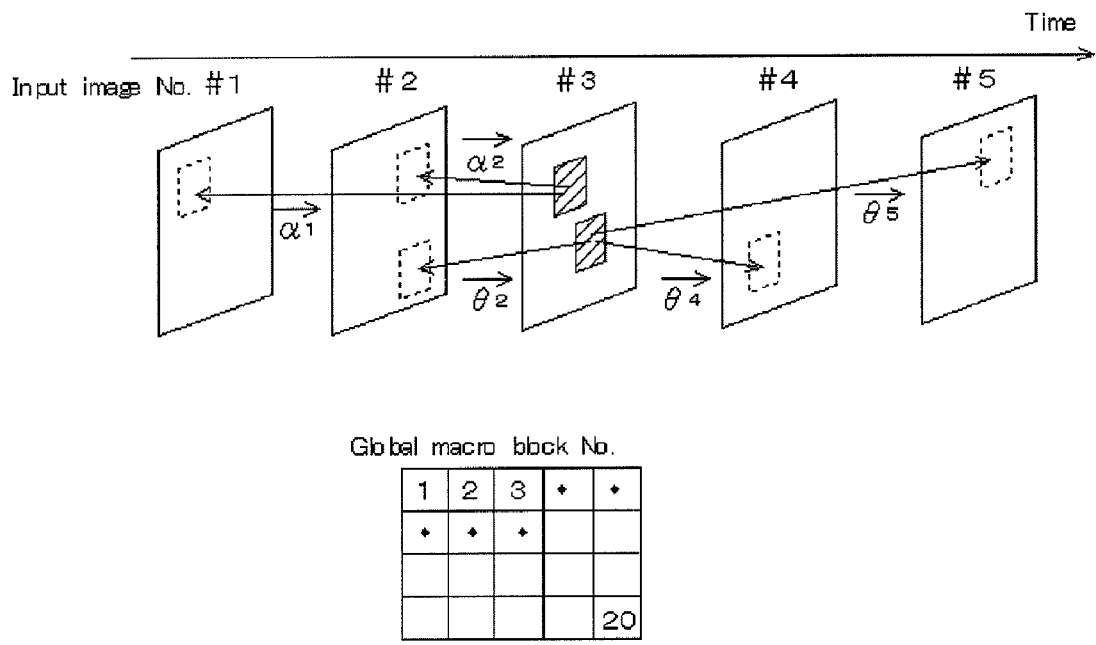
FIG. 13 is a conceptual diagram showing a storing table for detected global motion vector stored by a conventional image coding apparatus.

FIG. 13 is a conceptual diagram showing a storing table for detected global motion vector stored by a conventional image coding apparatus. As shown in FIG. 13, in the processing in recent years, in which compression rate and image quality have improved, it is required to detect the global motion vector not only between adjacent two frames but also between any two non-adjacent frames. In such case, as shown in the table of FIG. 13, the number of data of global motion vector to be stored in the image coding apparatus becomes the number acquired by a multiplication of the number of the inputted image (or number of frame images can be referred by one frame image) by the number of macro blocks. Meanwhile, according to the image coding apparatus of the fourth embodiment, the global motion vector between any (non-adjacent) two frames is acquired by simulated calculation by means of cumulated calculation of a plurality of adjacent global motion vectors, so that it becomes possible to reduce the number of the global macro blocks to be stored.

Figure 14:
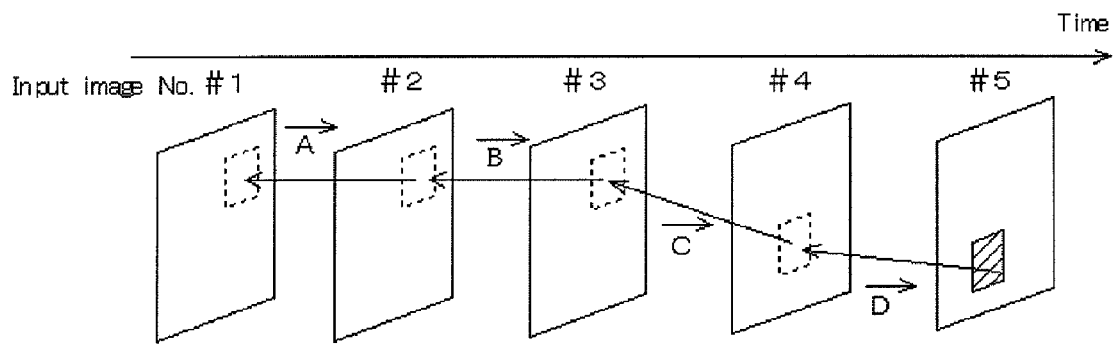
FIG. 14 is a conceptual diagram showing a calculation process of global motion vector between two non-adjacent frames in an image coding apparatus of a fourth embodiment.

FIG. 14 is a conceptual diagram showing a calculation process of global motion vector between two non-adjacent frames in an image coding apparatus of the fourth embodiment. As shown in FIG. 14, in the fourth embodiment, for example, the global motion vector between frames #1 to #5 of the global macro block in the shaded frame #5 is calculated as follows. Therefore, cumulative calculation of the global motion vector D between frames #4 to #5, the global motion vector C between frames #3 to #4, . . . , and the global motion vector A between frames #1 to #2 is carried out, thereby acquiring the global motion vector.

As described above, the global motion vector between two non-adjacent frames is stored, so that it becomes possible to reduce the data amount to be stored. Note that, as described below, since the case where the destination of the global macro block in the subsequent frame is perfectly identical to a global macro block in the subsequent frame is rare, the global macro block may be estimated from the global motion vectors of peripheral four global macro blocks, for example, by means of bi-linear interpolation etc.

Configuration of Fourth Embodiment

Figure 15:
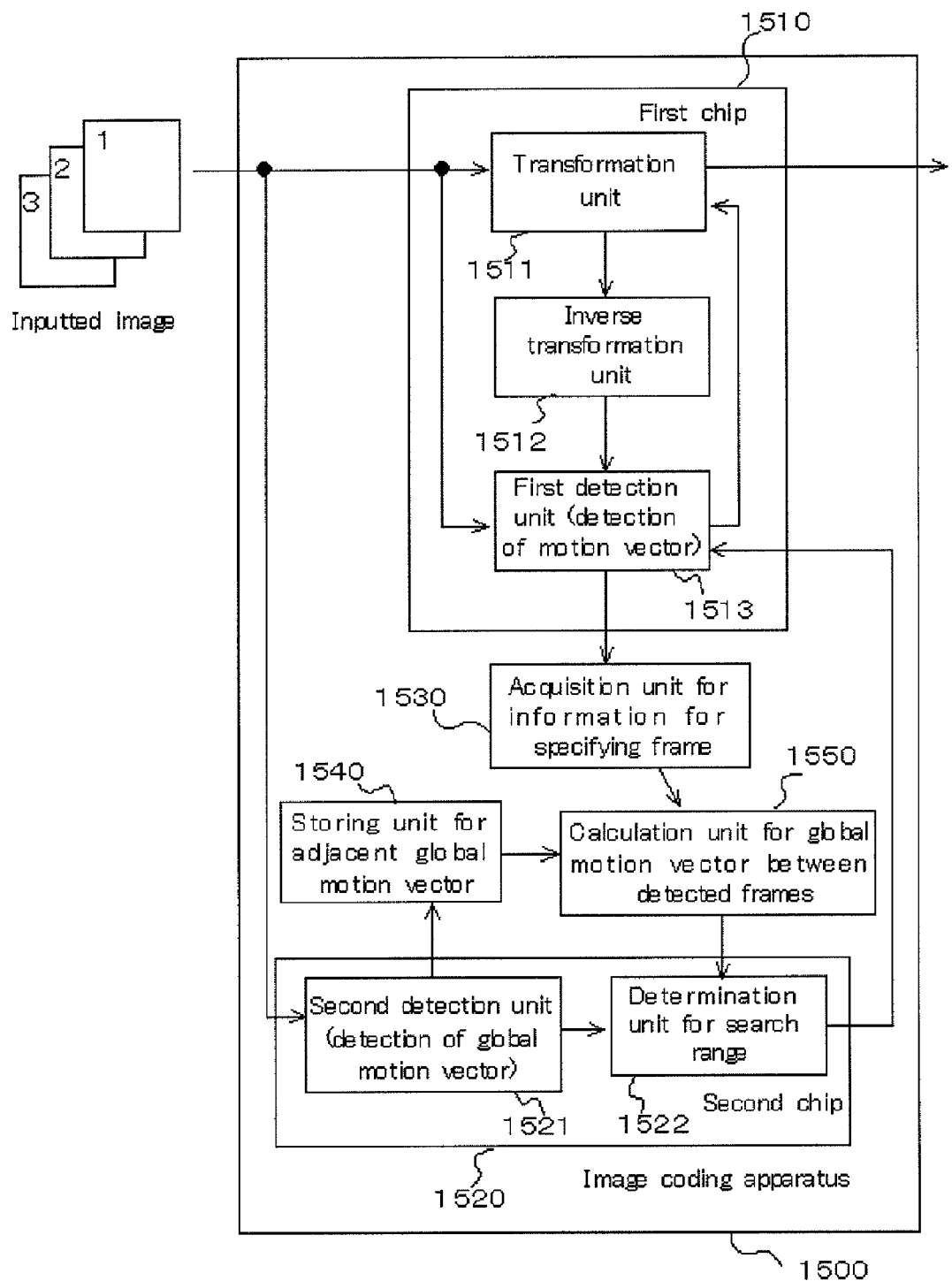
FIG. 15 is a functional block diagram of the image coding apparatus of the fourth embodiment.

FIG. 15 is a functional block diagram of the image coding apparatus of the fourth embodiment. As shown in FIG. 15, an 'image coding apparatus' (1500) is an image coding apparatus based on the first embodiment, and comprises a 'first chip' (1510), a 'second chip' (1520), which are separately arranged. The 'first chip' comprises a 'transformation unit' (1511), an 'inverse transformation unit' (1512), and a 'first detection unit' (1513). The 'second chip' comprises a 'second detection unit' (1521), and a 'determination unit for search range' (1522), and respective processings can be carried out independently. Needless to say, based on the second and third embodiments, the 'determination unit for usage of global motion vector' etc. may be comprised. Note that these functional blocks have been described in the first embodiment etc., so that descriptions are omitted. The image coding apparatus of the fourth embodiment further comprises an 'acquisition unit for information for specifying frame' (1530), a 'storing unit for adjacent global motion vector' (1540), and a 'calculation unit for global motion vector between detected frames' (1550).

The 'acquisition unit for information for specifying frame' (1530) has a function of acquiring information for specifying frame. The 'information for specifying frame' is information for specifying a frame to be coded by means of the motion vector, and a frame to be referenced for generating the motion vector. An example of the information includes identification information for a frame to be a coding object and a reference frame of the motion vector. The image coding apparatus of the fourth embodiment calculates the global motion vector between the frames specified by the acquired information for specifying frame according to the following two functional blocks.

The 'storing unit for adjacent global motion vector' (1540) has a function of storing an adjacent global motion vector. The 'adjacent global motion vector' is a global motion vector value between adjacent frames detected by the second detection unit (1521). This storing unit for adjacent global motion vector may store data of the global motion vector between adjacent frames with respect to each global macro block as shown in a data table of global macro block in FIG. 14 such as 'the global motion vector between frames #1 to #2 of the global macro block 2 is A' or 'the global motion vector between frames #2 to #3 of the global macro block 2 is B'. As described above, in the fourth embodiment, only the global motion vector between adjacent frames is stored, so that it becomes possible to reduce amount of stored data in comparison with the case of storing all global motion vectors between any frames.

Additionally, in the fourth embodiment, in cases where the global motion vector between any non-adjacent frames is necessary, the after-mentioned 'calculation unit for global motion vector between detected frames' calculates based on the adjacent global motion vector, thereby estimating the global motion vector between non-adjacent frames.

The 'calculation unit for global motion vector between detected frames' (1550) has a function of calculating global motion vector between the adjacent two frames specified by the information for specifying frame based on a plurality of the adjacent global motion vectors stored in the storing unit for adjacent global motion vector. An example of the 'calculation based on a plurality of the adjacent global motion vectors' includes cumulative calculation of adjacent global motion vector, and cumulative calculation of (estimated) adjacent global motion vector estimated by linear interpolation by means of adjacent global motion vector. For example, in FIG. 14, in cases where a destination of a global macro block is perfectly identical to a global macro block in an adjacent frame, for example, the case where the destination in the frame #4 of the global macro block 6 in the frame #5 is perfectly identical to the global macro block 5 in the frame #4, it is possible to calculate the global motion vector between frames #5 to #3 by merely adding the adjacent global motion vectors D and C. However, such a case is rare. Accordingly, in the fourth embodiment, the destination of the global macro block 6 in frame #5 is estimated by means of bi-linear interpolation etc. of the global motion vectors of peripheral global macro blocks of the destination, thereby carrying out cumulative calculation of the estimated global motion vector.

Concretely speaking, it is possible to calculate by CPU the destination in frame #4 of the global macro block 6 in frame #5 by means of the global motion vectors D stored in the memory. Subsequently, by means of the position (coordinate) information of the calculated destination in frame #4, the peripheral macro blocks such as four global macro blocks '1', '2', '5', and '6' are selected by the calculation of CPU. Subsequently, for example, the respective weighting coefficients are calculated by the CPU from distance ratios between the central coordinates of the respective macro blocks and the central coordinate of the destination. Subsequently, cumulative calculation of the global motion vectors in the respective global macro blocks, which has been multiplied by the respective weighting coefficients, is carried out, and the average value is calculated by the CPU, thereby calculating the global motion vector of the destination in frame #4 estimated by linear interpolation. Subsequently, by carrying out cumulative calculation of the estimated global motion vector between adjacent frames, it becomes possible to calculate the global motion vector between non-adjacent frames. Therefore, according to the image coding apparatus of the fourth embodiment, it becomes possible to calculate the global motion vector between non-adjacent frames by storing only the data table having a small amount of information as shown in FIG. 14.

Processing Flow of Fourth Embodiment

Figure 16:
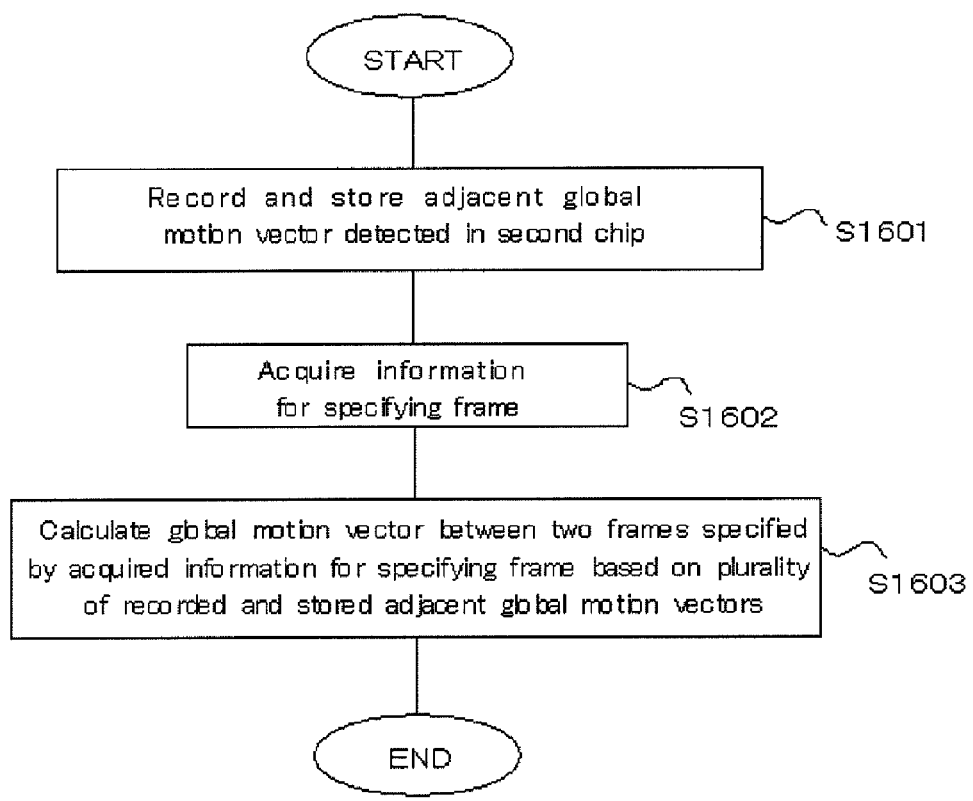
FIG. 16 is a flowchart showing processing in the image coding apparatus of the fourth embodiment.
Figure 17:
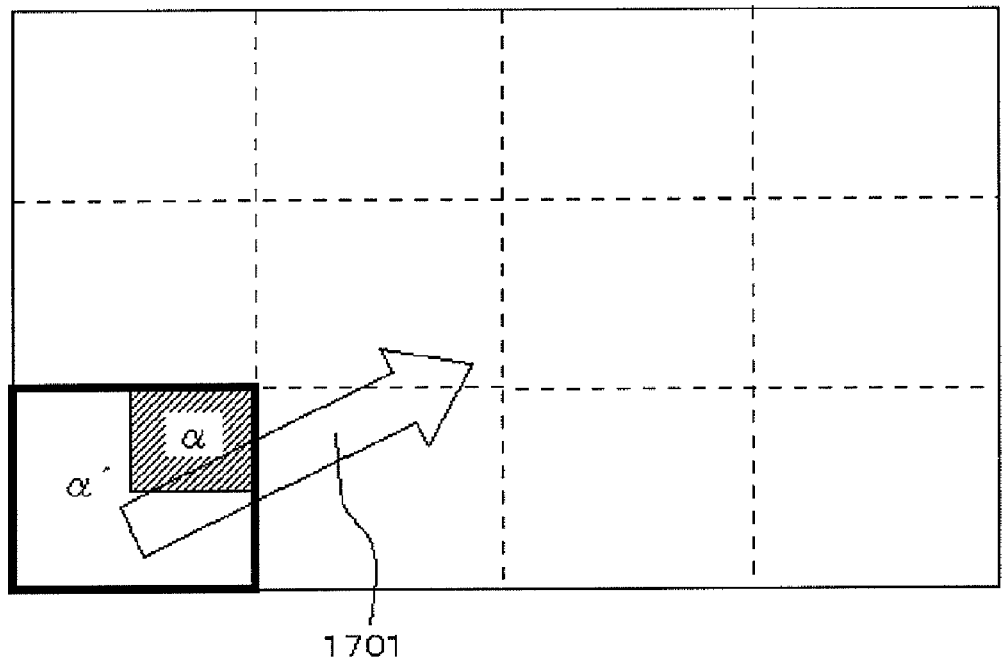
FIGS. 17(a) and 17(b) are schematic diagrams exemplifying detection of motion vector on a macro block basis by means of conventional global motion vector.
Figure 17:
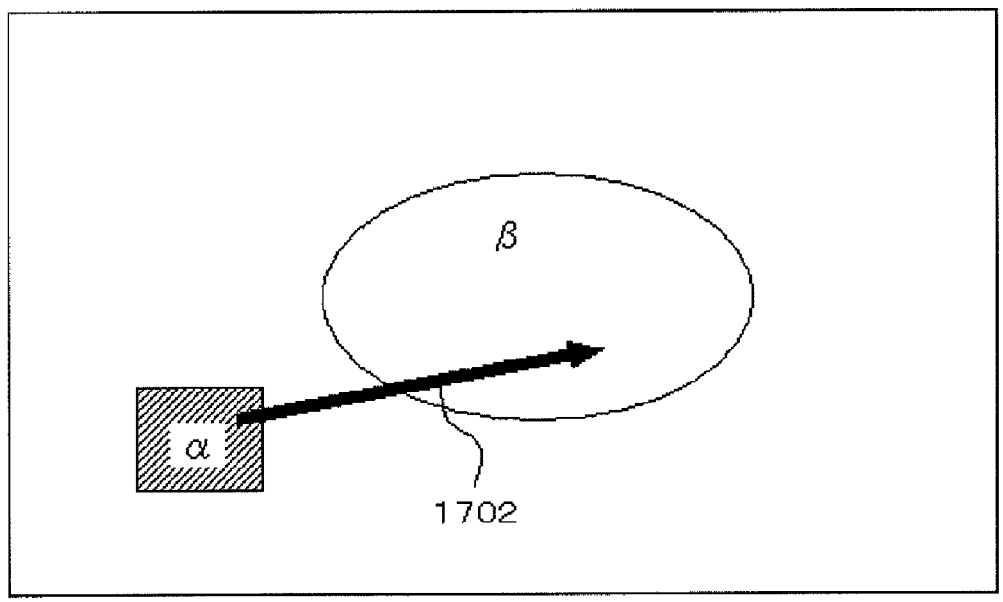

FIG. 16 is a flowchart showing processing in the image coding apparatus of the fourth embodiment. The following steps may be processing steps recorded in a medium and configuring a program for controlling a computer. The detection of the motion vector in the first and second chips and the detection of the adjacent global motion vector are the same as those of the first embodiment, so that descriptions are omitted. As shown in FIG. 16, at the outset, the adjacent global motion vector is recorded and stored (step S1601). Subsequently, information for specifying frame is acquired (step S1602). Subsequently, the global motion vector between two frames specified by the information for specifying frame acquired in step S1602 is calculated based on the plurality of the adjacent global motion vectors recorded and stored in step S1601, for example, by means of estimation or cumulative calculation by linear interpolation (step S1603).

Brief Description of Effects of Fourth Embodiment

As described above, according to the image coding apparatus of the fourth embodiment, it becomes possible to calculate the global motion vector between any non-adjacent frames by storing only the data table of the global motion vector between adjacent global macro blocks, thereby reducing the amount of data to be stored.

Another Fourth Embodiment

Additionally, the image coding apparatus of another fourth embodiment may have the following configuration other than the above configuration. Therefore, in the above-described image coding apparatus, the global motion vector between non-adjacent frames is calculated by the cumulative calculation etc. by means of the global motion vector between adjacent frames. Meanwhile, in the image coding apparatus of another fourth embodiment, only the global motion vector between non-adjacent frames is stored, the linear interpolation etc. is carried out by means of the global motion vector between non-adjacent frames, so that the adjacent global motion vector, or the global motion vector between non-adjacent frames having different temporal widths from the above non-adjacent frames is estimated. Concretely speaking, the image coding apparatus comprises a 'storing unit for non-adjacent global motion vector' in place of the 'storing unit for adjacent global motion vector' of the fourth embodiment. Meanwhile, assuming that the movement of the image between non-adjacent frames to be referenced is the same, the vector value acquired by a multiplication of 'the number of frames between reference non-adjacent frames to be referred by the global motion vector between frame to adjacent frame' may be regarded as the global motion vector between non-adjacent frames to be referred. By the above processing, it becomes possible to reduce the number of references of the global motion vector table, thereby reducing processing load.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image coding apparatus, which carries out coding of an inputted image, of a plurality of inputted images including one or more previous inputted images as reference images and a current image, by means of motion vector, comprising:
    a first detection unit, which is for detecting the motion vector by searching a predetermined search range in the inputted image based on macro block of transformation-inverse transformation-processed image;
    a second detection unit, which is for detecting a global motion vector between the inputted images based on a global macro block, larger than said macro block;
    a determination unit for search range, which can determine search range of the search by the first detection unit by means of the global motion vector detected by said second detection unit;
    a determination unit for utilization of global motion vector, which determines whether or not said global motion vector is utilized; and
    an acquisition unit for image size, which acquires image size of said inputted image, wherein
    said determination unit for utilization of global motion vector further comprises,
    a determination means dependent on image size, which carries out said determination based on the image size acquired by said acquisition unit for image size.

2. The image coding apparatus according to claim 1, further comprising:
    an acquisition unit for information for specifying frame, which acquires information for specifying frame, which is for specifying a frame to be coded by means of the motion vector, and a frame to be referred for generating the motion vector;
    a storing unit for adjacent global motion vector, which stores an adjacent global motion vector as the global motion vector detected by the second detection unit, in which the adjacent global motion vector is a value between adjacent frames; and
    a calculation unit for global motion vector between detected frames, which calculates global motion vector between the adjacent two frames specified by the information for specifying frame based on a plurality of the adjacent global motion vectors stored in the storing unit for adjacent global motion vector.

3. The image coding apparatus according to claim 1, further comprising:
    an acquisition unit for information for specifying frame, which acquires information for specifying frame, which is for specifying a frame to be coded by means of the motion vector, and a frame to be referred for generating the motion vector;
    a storing unit for adjacent global motion vector, which stores an adjacent global motion vector as the global motion vector detected by the second detection unit, in which the adjacent global motion vector is a value between adjacent frames; and
    a calculation unit for global motion vector between detected frames, which calculates global motion vector between the adjacent two frames specified by the information for specifying frame based on a plurality of the adjacent global motion vectors stored in the storing unit for adjacent global motion vector.

4. The image coding apparatus according to claim 1, further comprising:
    an acquisition unit for information for specifying frame, which acquires information for specifying frame, which is for specifying a frame to be coded by means of the motion vector, and a frame to be referred for generating the motion vector;
    a storing unit for adjacent global motion vector, which stores an adjacent global motion vector as the global motion vector detected by the second detection unit, in which the adjacent global motion vector is a value between adjacent frames; and
    a calculation unit for global motion vector between detected frames, which calculates global motion vector between the adjacent two frames specified by the information for specifying frame based on a plurality of the adjacent global motion vectors stored in the storing unit for adjacent global motion vector.

5. An image coding method for causing a computer to carry out coding of an inputted image by means of motion vector detected by search based on macro block of transformation-inverse transformation-processed image, comprising:
a second detection step, which is for detecting a global motion vector between the inputted images based on a global macro block, larger than said macro block;
a determination step for search range, which can determine search range of the search by the first detection unit by means of the global motion vector detected by said second detection step;
a first detection step, which is for detecting said motion vector by searching said determined search range based on a macro block; and
an acquisition step for image size, which acquires image size of said inputted image, wherein
said determination step for utilization of global motion vector further comprises,
wherein said determination step for utilization of further comprises steps for carrying out said determination based on the image size acquired by said acquisition step for image size.

6. The image coding method according to claim 5, further comprising: a determination step for utilization of global motion vector, which determines whether or not said global motion vector is utilized.

7. The image coding method according to claim 6, further comprising:
an acquisition step for information for specifying frame, which acquires information for specifying frame, which is for specifying a frame to be coded by means of the motion vector, and a frame to be referenced for generating the motion vector;
a recording step for adjacent global motion vector, which records and stores an adjacent global motion vector as the global motion vector detected by the second detection unit, in which the adjacent global motion vector is a value between adjacent frames; and
a calculation step for global motion vector between detected frames, which calculates global motion vector between the adjacent two frames specified by the information for specifying frame based on a plurality of the adjacent global motion vectors recorded and stored in the recording step for adjacent global motion vector.

8. The image coding method according to claim 5, further comprising:
an acquisition step for information for specifying frame, which acquires information for specifying frame, which is for specifying a frame to be coded by means of the motion vector, and a frame to be referenced for generating the motion vector;
a recording step for adjacent global motion vector, which records and stores an adjacent global motion vector as the global motion vector detected by the second detection unit, in which the adjacent global motion vector is a value between adjacent frames; and
a calculation step for global motion vector between detected frames, which calculates global motion vector between the adjacent two frames specified by the information for specifying frame based on a plurality of the adjacent global motion vectors recorded and stored in the recording step for adjacent global motion vector.

9. The image coding method according to claim 5, further comprising:
an acquisition step for information for specifying frame, which acquires information for specifying frame, which is for specifying a frame to be coded by means of the motion vector, and a frame to be referenced for generating the motion vector;
a recording step for adjacent global motion vector, which records and stores an adjacent global motion vector as the global motion vector detected by the second detection unit, in which the adjacent global motion vector is a value between adjacent frames; and
a calculation step for global motion vector between detected frames, which calculates global motion vector between the adjacent two frames specified by the information for specifying frame based on a plurality of the adjacent global motion vectors recorded and stored in the recording step for adjacent global motion vector.

* * * * *